(12) United States Patent
Son et al.

(10) Patent No.: US 10,578,790 B2
(45) Date of Patent: Mar. 3, 2020

(54) LIGHT SOURCE UNIT, DISPLAY DEVICE INCLUDING THE LIGHT SOURCE UNIT, AND MANUFACTURING METHOD OF THE DISPLAY DEVICE

(71) Applicant: SAMSUNG DISPLAY CO., LTD., Yongin-si, Gyeonggi-do (KR)

(72) Inventors: Young Hye Son, Yongin-si (KR); Yong Hoon Kwon, Hwaseong-si (KR); Won Jin Kim, Hwaseong-si (KR); Woo Suk Seo, Yongin-si (KR); Si Joon Song, Suwon-si (KR); Kwang Wook Choi, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/863,878

(22) Filed: Jan. 6, 2018

(65) Prior Publication Data
US 2018/0196183 A1  Jul. 12, 2018

(30) Foreign Application Priority Data

Jan. 11, 2017 (KR) .......................... 10-2017-0004022

(51) Int. Cl.
*G02B 6/00* (2006.01)
*F21V 8/00* (2006.01)
*F21V 9/38* (2018.01)
*F21Y 115/10* (2016.01)

(52) U.S. Cl.
CPC .............. *G02B 6/0023* (2013.01); *F21V 9/38* (2018.02); *G02B 6/0065* (2013.01); *G02B 6/0068* (2013.01); *F21Y 2115/10* (2016.08); *G02B 6/009* (2013.01); *G02B 6/0028* (2013.01)

(58) Field of Classification Search
CPC ............................ G02B 6/0026; G02B 6/0023
USPC ........................................................ 362/608
See application file for complete search history.

(56) References Cited

U.S. PATENT DOCUMENTS

| | | | | | |
|---|---|---|---|---|---|
| 2004/0257797 | A1* | 12/2004 | Suehiro | ................. | H01L 33/507 362/34 |
| 2007/0064131 | A1* | 3/2007 | Sawanobori | .......... | H01L 33/505 348/294 |
| 2009/0224177 | A1* | 9/2009 | Kinomoto | .......... | C09K 11/7721 250/484.4 |
| 2012/0113354 | A1* | 5/2012 | Park | ................... | G02F 1/133606 349/62 |
| 2012/0241784 | A1* | 9/2012 | Tang | ...................... | H01L 33/507 257/98 |

(Continued)

FOREIGN PATENT DOCUMENTS

| KR | 1020150093890 A | 8/2015 | | |
|---|---|---|---|---|
| KR | 1020160025142 A | 3/2016 | | |
| WO | WO-2017040475 A1 * | 3/2017 | ............. | C03C 27/08 |

*Primary Examiner* — Christopher M Raabe
(74) *Attorney, Agent, or Firm* — Cantor Colburn LLP

(57) ABSTRACT

A light source unit includes: a light source circuit board; light sources disposed on the light source circuit board and which emit light; a wavelength converter disposed on the light sources to be spaced apart from the light sources and to partially overlap with the light sources; a first glass disposed between the light sources and the wavelength converter; and a second glass disposed on the wavelength converter and at least partially in direct contact with, and coupled to, the first glass.

18 Claims, 18 Drawing Sheets

(56) References Cited

U.S. PATENT DOCUMENTS

| | | | | |
|---|---|---|---|---|
| 2013/0175558 A1* | 7/2013 | Orsley | ............... | H01L 33/644 |
| | | | | 257/88 |
| 2013/0294107 A1* | 11/2013 | Ohkawa | ............ | G02F 1/133615 |
| | | | | 362/606 |
| 2014/0022779 A1* | 1/2014 | Su | ............... | F21V 9/30 |
| | | | | 362/231 |
| 2015/0214445 A1* | 7/2015 | Qiu | ............... | H01L 27/15 |
| | | | | 257/88 |
| 2015/0219289 A1* | 8/2015 | Seo | ............... | G02F 1/353 |
| | | | | 362/608 |
| 2015/0226905 A1* | 8/2015 | Yoon | ............... | G02B 6/0065 |
| | | | | 362/608 |
| 2018/0149806 A1* | 5/2018 | Li | ............... | G02B 6/0023 |
| 2018/0210125 A1* | 7/2018 | Song | ............... | F21K 9/64 |

* cited by examiner

LIGHT SOURCE UNIT, DISPLAY DEVICE INCLUDING THE LIGHT SOURCE UNIT, AND MANUFACTURING METHOD OF THE DISPLAY DEVICE

This application claims priority to Korean Patent Application No. 10-2017-0004022, filed on Jan. 11, 2017, and all the benefits accruing therefrom under 35 U.S.C. 119, the content of which in its entirety is herein incorporated by reference.

BACKGROUND

1. Field

The disclosure relates to a light source unit, a display device including the light source unit, and a manufacturing method of the display device.

2. Description of the Related Art

In accordance with recent developments in multimedia technology, display devices such as a liquid crystal display ("LCD") device have been widely used in various fields. The LCD device typically includes a display panel having two substrates on which electric field generating electrodes such as pixel electrodes and a common electrode are provided, a liquid crystal layer interposed between the two substrates, and a light source unit for providing light to the display panel. The LCD device displays an image by applying voltages to the electric field generating electrodes to realign liquid crystal molecules in the liquid crystal layer and thus to control the amount of light passing through the liquid crystal layer.

The light source unit generally includes a light source that emits light and a light source circuit board that provides signals and power for driving the light source. The light source may be a light-emitting diode ("LED") emitting white light, for example.

SUMMARY

Typically, white light emitted by a light source may include red, green, and blue wavelengths. However, white light emitted by a typical light emitting diode ("LED") may also have other unintended wavelengths mixed therein and may thus lower the color purity of a display device. Accordingly, a method to improve the color purity of a display device is desired.

Exemplary embodiments of the invention provide a light source unit which emits white light with high color purity with the use of a wavelength converter and with minimized optical loss between a light source and the wavelength converter by precisely maintaining the alignment between the light source and the wavelength converter, even when an external impact is applied thereto.

Exemplary embodiments of the invention also provide a display device with improved color purity and reduced number of elements and parts thereof, thereby being thinner and lighter.

Exemplary embodiments of the invention also provide a manufacturing method of a display device having improved color purity with improved manufacturing processability by minimizing the number of elements and parts of the display device.

However, exemplary embodiments of the disclosure are not restricted to those set forth herein. The above and other exemplary embodiments of the disclosure will become more apparent to one of ordinary skill in the art to which the disclosure pertains by referencing the detailed description of the disclosure given below.

According to an exemplary embodiment of the invention, a light source unit includes: a light source circuit board; light sources disposed on the light source circuit board and which emit light; a wavelength converter disposed on the light sources to be spaced apart from the light sources and to partially overlap with the light sources; a first glass disposed between the light sources and the wavelength converter; and a second glass disposed on the wavelength converter and at least partially in direct contact with, and coupled to, the first glass.

In an exemplary embodiment, the first glass and the second glass may be at least partially fused to each other, and a contact surface between the first glass and the second glasses may include a first portion where a physical interface between the first glass and the second glasses exists, a second portion where the physical interface between the first glass and the second glasses does not exist, and a third portion overlapping with the wavelength converter.

In an exemplary embodiment, the wavelength converter may be in contact with the first glass or the second glass, the wavelength converter may be completely surrounded by the first glass and the second glasses, the first portion, the second portion and the third portion of the contact surface between the first glass and the second glasses may be on a same level as each other, and the first portion may be disposed between the second portion and the third portions.

In an exemplary embodiment, a first surface of the first glass facing to the second glass may have a concave groove, and the wavelength converter may be received in the concave groove.

In an exemplary embodiment, the light source unit may further include: a third glass disposed between the light sources and the first glass and placed at least partially in direct contact with, and coupled to, the first glass, wherein the third glass may be placed in direct contact with the light source circuit board, and the light sources may be sealed by the third glass and the light source circuit board.

In an exemplary embodiment, a gap may be defined in the light source unit between the wavelength converter and the second glass.

In an exemplary embodiment, a first surface of the second glass facing to the first glass may have a concave groove, and the wavelength converter may be received in the concave groove.

In an exemplary embodiment, the light source unit may further include: a third glass disposed between the light sources and the first glass and placed at least partially in direct contact with, and coupled to, the first glass, where the third glass may be in direct contact with the light source circuit board, and the light sources may be sealed by the third glass and the light source circuit board.

In an exemplary embodiment, a gap may be defined in the light source unit between the first glass and the wavelength converter.

In an exemplary embodiment, a seed-like shaped structure may exist in the second portion, the seed-like shaped structure may have a long axis and a short axis, the short axis may be arranged in substantially parallel to the contact surface between the first glass and the second glass, and a width of the second portion may be in a range of about 60 micrometers (μm) to 120 μm.

In an exemplary embodiment, the light sources may be disposed to be spaced apart from one another in a first direction, and a width of the wavelength converter in a second direction, which intersects the first direction, may be 1.2 to 2 times greater than a width of the light sources in the second direction.

In an exemplary embodiment, the light sources may emit light having a blue wavelength, the wavelength converter may include a resin material and a wavelength conversion material dispersed in the resin material, and the wavelength conversion material of the wavelength converter may consist essentially of a red wavelength conversion material and a green wavelength conversion material.

In an exemplary embodiment, the light source unit may further include: a green wavelength conversion material dispersed in the first glass, wherein the light sources may emit light having a blue wavelength, the wavelength converter may include a resin material and a wavelength conversion material dispersed in the resin material, and the wavelength conversion material of the wavelength converter may consist essentially of a red wavelength conversion material.

In an exemplary embodiment of the invention, there is provided a display device. The display device includes: a light guide plate having a light-entering side and a light-exiting side; a light source unit disposed on the light-entering side of the light guide plate; and a display panel disposed on the light-exiting side of the light guide plate. In such an embodiment, the light source unit includes light sources which emit light, a wavelength converter disposed between the light sources and the light guide plate to be spaced apart from the light sources, a first glass disposed between the light sources and the wavelength converter, and a second glass disposed between the wavelength converter and the light guide plate and placed at least partially in direct contact with, and coupled to, the first glass.

In an exemplary embodiment, the display panel may be supported by the light guide plate.

In an exemplary embodiment, a bonding pattern is defined between the light guide plate and the display panel, and the light guide plate and the display panel are coupled to each other by the bonding pattern. In such an embodiment, in a plan view, the bonding pattern may extend along edges of the light guide plate, but not along an edge corresponding to the light-entering side of the light guide plate.

In an exemplary embodiment, the light-entering side of the light guide plate and the second glass of the light source unit may be in direct contact with, and coupled to, each other.

In an exemplary embodiment, the second glass and the light guide plate may be at least partially fused to each other, a contact surface between the second glass and the light guide plate may include a first portion where a physical interface between the second glass and the light guide plate exists, a second portion where the physical interface between the second glass and the light guide plate does not exist, and a third portion overlapping with the wavelength converter, and the second portion may be located on a different level from the third portion.

In an exemplary embodiment of the invention, a manufacturing method of a display device includes: preparing a module into which a light guide plate having a light-entering side and a light-exiting side, a light source unit disposed on a side of the light-entering side of the light guide plate, and a display panel disposed on the light-exiting side of the light guide plate are integrated with one another; preparing a bottom cover in which a storage space is defined; and coupling the module and the bottom cover by inserting the light guide plate and the light source unit in the storage space of the bottom cover. In such an embodiment, the light source unit includes light sources which emit light, a wavelength converter disposed between the light sources and the light guide plate to be spaced apart from the light sources, a first glass disposed between the light sources and the wavelength converter, and a second glass disposed between the wavelength converter and the light guide plate and placed at least partially in direct contact with, and coupled to, the first glass.

In an exemplary embodiment, the first glass and the second glass may be fused to each other by using laser, and a pulse width of the laser may be in a range of about 10 femto seconds to about 50 femto seconds.

According to exemplary embodiments of the invention, white light with high color purity may be emitted with the use of a wavelength converter, and optical loss between a light source and the wavelength converter may be minimized by precisely maintaining the alignment between the light source and the wavelength converter, even when an external impact is applied thereto.

In such embodiments, a display device may have improved color purity, and the number of elements and parts thereof may be minimized, thereby being thinner and lighter.

In such embodiments, color purity and manufacturing processability thereof may be improved by minimizing the number of elements and parts of a display device.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
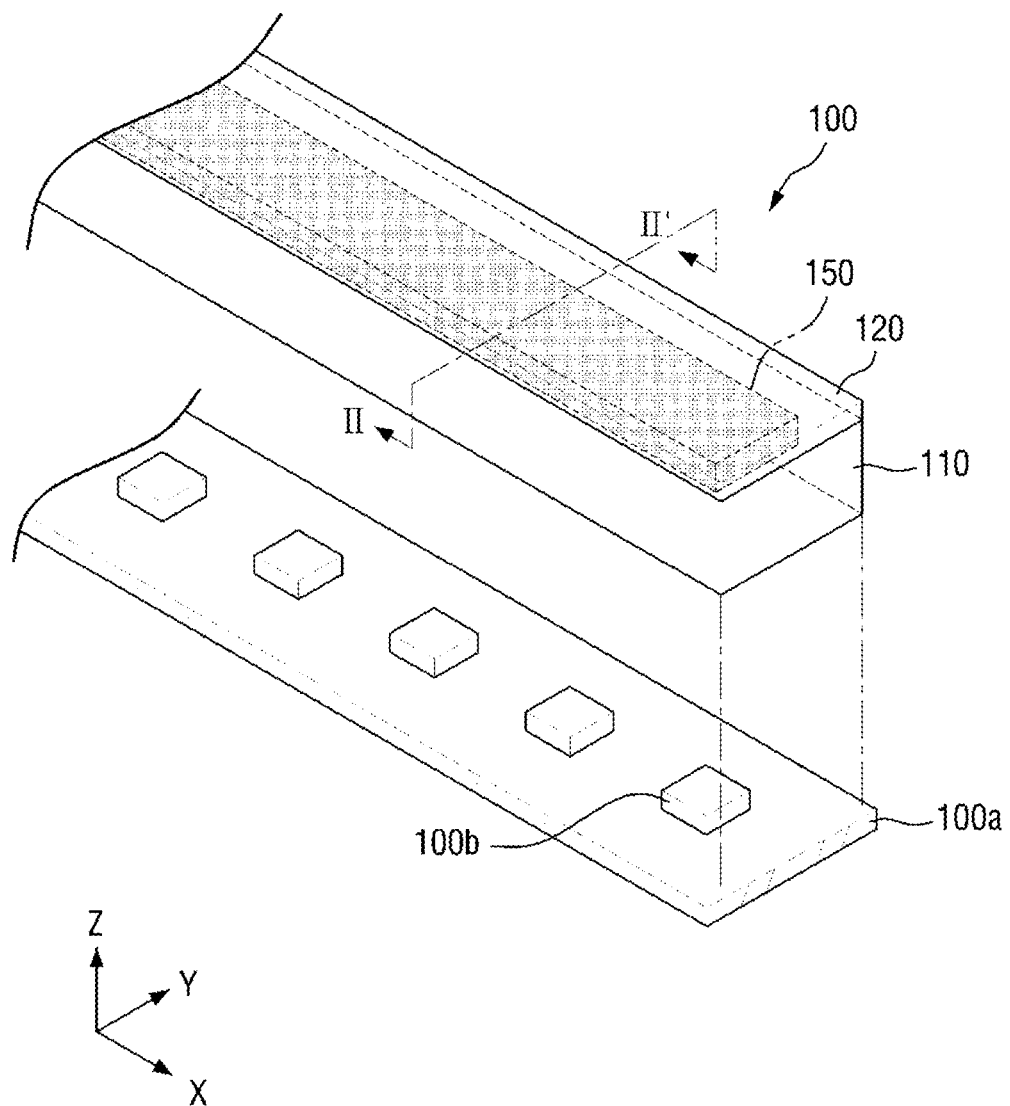
FIG. 1 is an exploded perspective view of a light source unit according to an exemplary embodiment of the disclosure.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof "At least one" is not to be construed as limiting "a" or "an." "Or" means "and/or." As used herein, the term "and/or" includes any and all combinations of one or more of the associated listed items.

In the description that follows, a first direction X denotes an arbitrary direction on a particular plane, a second direction Y denotes a direction intersecting the first direction X over the particular plane, and a third direction Z denotes a direction perpendicular to the particular plane.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments of the disclosure will hereinafter be described in detail with reference to the accompanying drawings.

Figure 2:
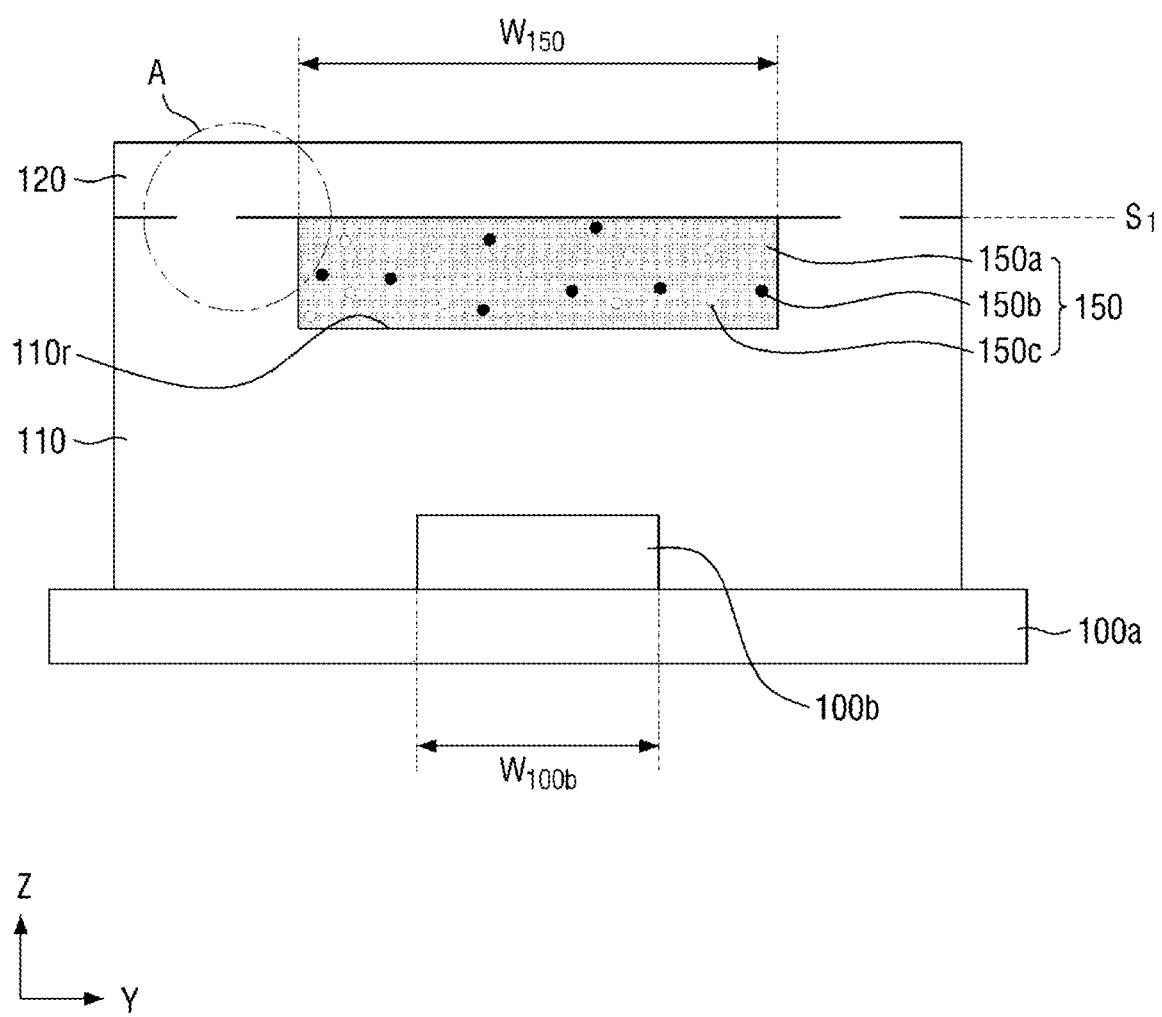
FIG. 2 is a cross-sectional view taken along line II-II' of FIG. 1.
Figure 3:
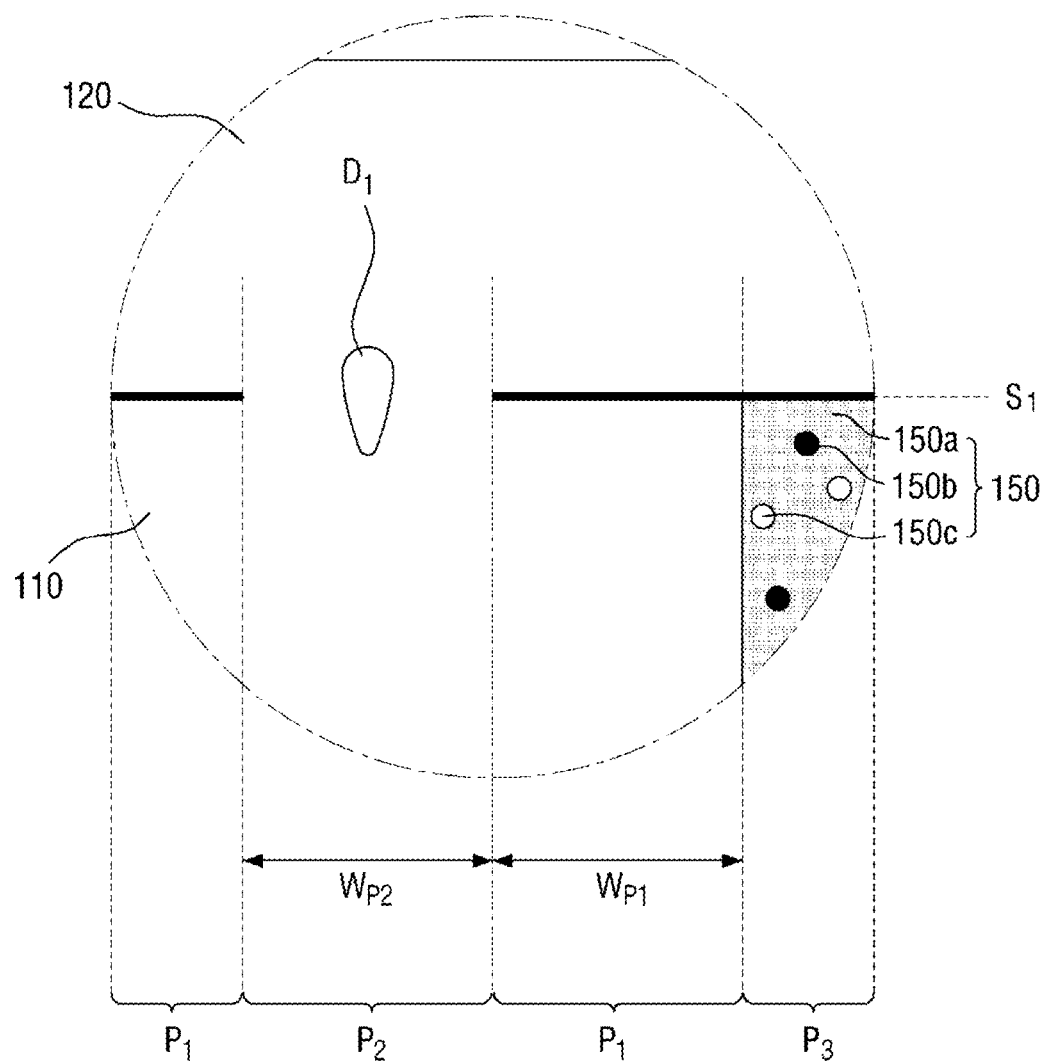
FIG. 3 is an enlarged view of an area A of FIG. 2.

FIG. 1 is an exploded perspective view of a light source unit according to an exemplary embodiment of the disclosure. FIG. 2 is a cross-sectional view taken along line II-II' of FIG. 1. FIG. 3 is an enlarged view of an area A of FIG. 2.

Referring to FIGS. 1 through 3, an exemplary embodiment of a light source unit 100 may include a light source circuit board 100a, one or more light sources 100b, which are disposed, e.g., mounted, on the light source circuit board 100a and emit light, and a wavelength converter 150, which is disposed on the light sources 100b.

The light source circuit board 100a may be connected to an external power source (not illustrated) and may thus provide signals and power to the light sources 100b for driving the light sources 100b. The light source circuit board 100a may extend substantially in the first direction X.

The light sources 100b may be disposed on the light source circuit board 100a. A plurality of light sources 100b may be disposed to be spaced apart from one another along the first direction X. The light sources 100b may be light-emitting diodes ("LED" s). In an exemplary embodiment, the light sources 100b may be LEDs that emits blue light. In one exemplary embodiment, for example, the light sources 100b may emit blue light having a single peak wavelength in a range of about 430 nanometers (nm) to about 470. About 80% of the light emitted by the light sources 100b may be in a wavelength range of about 430 nm to about 470 nm. In another exemplary embodiment, the light sources 100b may be LEDs that emit light in an ultraviolet ("UV") wavelength range.

A first glass 110 may be disposed on the light sources 100b. The first glass 110 may include or be formed of a glass material having a high light transmittance. The first glass 110 may extend in the first direction X. In an exemplary embodiment, the first glass 110 may be a sealing member disposed on the light source circuit board 100a and the light sources 100b to seal and fix the light sources 100b. A second surface (e.g., the bottom surface in FIG. 1) of the first glass 110 may have recessed grooves, and the light sources 100b may be inserted in the recessed grooves, respectively. The first glass 110 and the light sources 100b may be at least partially spaced apart from each other. The first glass 110 may be disposed between the light sources 100b and the wavelength converter 150 to secure space between the light sources 100b and the wavelength converter 150.

In an exemplary embodiment, the first glass 110 may provide space for accommodating the wavelength converter 150. In one exemplary embodiment, for example, a first surface (e.g., the top surface in FIG. 1) of the first glass 110 may have a trench-shaped concave groove 110r extending in the first direction X.

The wavelength converter 150 may be disposed on the light sources 100b to be spaced apart from the light sources 100b in the third direction Z. The wavelength converter 150 may be inserted in the concave groove 110r of the first glass 110. The wavelength converter 150 may be at least partially in direct contact with the first glass 110. The wavelength converter 150 may at least partially overlap with the light sources 100b and may extend in the first direction X. The wavelength converter 150 may completely cover the light sources 100b in a plan view. In one exemplary embodiment, for example, a width $W_{150}$ of the wavelength converter 150 in the second direction Y may be larger than a width $W_{100b}$ of the light sources 100b in the second direction Y. The width $W_{150}$ of the wavelength converter 150 may be about 1.2 to 2 times larger than the width $W_{100b}$ of the light sources 100b. In an exemplary embodiment where the width $W_{150}$ of the wavelength converter 150 is 1.2 times larger than the width $W_{100b}$ of the light sources 100b, light emitted from the light sources 100b may be suppressed from leaking without passing through the wavelength converter 150.

The wavelength converter 150 may convert the wavelength of light transmitted therethrough. In an exemplary embodiment, the wavelength converter 150 may be a wavelength shifter that shifts the peak wavelength of light transmitted therethrough. The wavelength converter 150 may include a base resin 150a and wavelength conversion particles (150b and 150c) dispersed in the base resin 150a.

The base resin 150a may account for most of the volume of the wavelength converter 150. The base resin 150a may include or be formed of a material capable of uniformly dispersing the wavelength conversion particles (150b and 150c) and having a high light transmittance. In one exemplary embodiment, for example, the base resin 150a may be an acrylate resin, an epoxy resin, a urethane resin, or a polyimide resin. The base resin 150a may be a thermosetting resin or a UV curing resin.

The wavelength conversion particles (150b and 150c) may include first wavelength conversion particles 150b that emit red light and second wavelength conversion particles 150c that emit green light. In an exemplary embodiment where the light sources 100b are light sources that emit blue light, the wavelength conversion particles (150b and 150c) may consist essentially of only the first wavelength conversion particles 150b and the second wavelength conversion particles 150c.

The first wavelength conversion particles 150b and the second wavelength conversion particles 150c may include a quantum dot material or a fluorescent material. In one exemplary embodiment, for example, the first wavelength conversion particles 150b and the second wavelength conversion particles 150c may include a quantum dot material.

The quantum dot material emits light of a specific color while having electrons transfer from a conduction band to a valence band.

The quantum dot material may have a core-shell structure. The core of the quantum dot material may be a semiconductor nanocrystalline material. In an exemplary embodiment, the core of the quantum dot material include silicon (Si)-based nanocrystals, group II-VI-based compound nanocrystals, and group III-V-based compound nanocrystals, for example, but the disclosure is not limited thereto. In an exemplary embodiment, the first wavelength conversion particles 150b and the second wavelength conversion particles 150c may have a core including at least one of cadmium selenide (CdSe), cadmium telluride (CdTe), cadmium sulfide (CdS) and indium phosphide (InP), and an outer shell including zinc sulfide (ZnS), for example.

In an exemplary embodiment, the average diameter of the first wavelength conversion particles 150b may be larger than the average diameter of the second wavelength conversion particles 150c. In one exemplary embodiment, for example, the average diameter of the first wavelength conversion particles 150b that emit red light is in a range of about 55 angstrom (Å) to about 65 Å, and the average diameter of the second wavelength conversion particles 150c that emit green light is in a range of about 40 Å to about 50 Å.

In an exemplary embodiment where the light sources 100b emit blue light having a single peak wavelength in a range of about 430 nm to 470 nm, the blue light emitted by the light sources 100b passes through the first glass 110 and then through the wavelength converter 150. In such an embodiment, at least some blue light emitted by the light sources 100b may be converted into red light having a peak wavelength in a range of about 610 nm to 650 nm by the first wavelength conversion particles 150b. In such an embodiment, at least some blue light emitted by the light sources 100b may be converted into green light having a peak wavelength in a range of about 530 nm to 570 nm by the second wavelength conversion particles 150c. In such an embodiment, at least some blue light emitted by the light sources 100b may directly pass through the base resin 150a. At least some green light emitted by the second wavelength conversion particles 150c may be converted into red light by the first wavelength conversion particles 150b. In such an embodiment, at least some red light emitted by the first wavelength conversion particles 150b and at least some green light emitted by the second wavelength conversion particles 150c may pass through the base resin 150a. Since the first wavelength conversion particles 150b and the second wavelength conversion particles 150c emit high-intensity light within a narrow wavelength band, light converted by the first wavelength conversion particles 150b and the second wavelength conversion particles 150c may have a wavelength band corresponding to a particular color and may have a high color purity. The light emitted by the light sources 100b and then transmitted through the wavelength converter 150 may be converted into high-purity white light having only red, green, and blue peak wavelengths.

In an exemplary embodiment where the light sources 100b emit UV light, the wavelength conversion particles (150b and 150c) may include the first wavelength conversion particles 150b that emit red light and the second wavelength conversion particles 150c that emit green light, and may further include third wavelength conversion particles (not illustrated) that emit blue light. The average diameter of the third wavelength conversion particles may be smaller than the average diameter of the second wavelength conversion particles 150c.

A second glass 120 may be disposed on the wavelength converter 150. The second glass 120 may extend in the first direction X. The second glass 120 may include or be formed of a glass material having a high light transmittance. The second glass 120 may include or be formed of the same glass material as, or a different glass material from, the first glass 110. The second glass 120 may be a cover member disposed on the first glass 110 and the wavelength converter 150 to seal the wavelength converter 150. The wavelength converter 150 may be completely surrounded and sealed by the first and second glasses 110 and 120. As a result, the wavelength converter 150 may be effectively prevented from being polluted and/or deformed by external moisture or impurities, and the durability of the light source unit 100, which emits high-purity white light, may be improved.

In an exemplary embodiment, first and second surfaces (e.g., the top and bottom surfaces in FIG. 2) of the second glass 120 may both be substantially flat. The second glass 120 may be at least partially in direct contact with the wavelength converter 150. The second glass 120 may be at least partially in direct contact with the first glass 110. In one exemplary embodiment, for example, the first and second glasses 110 and 120 may be at least partially fused to each other. In such an embodiment, the first and second glasses 110 and 120 may be at least partially fused to each other and may thus define a single unitary body with each other.

A contact surface $S_1$ between the first glass 110 and the second glass 120 has a first portion $P_1$ where the physical interface between the first and second glasses 110 and 120 exists, a second portion $P_2$ where the physical interface between the first and second glasses 110 and 120 substantially does not exist, and a third portion $P_3$ overlapping with the wavelength converter 150. The expression "the physical interface between two elements substantially does not exist", as used herein, means that any visually identifiable contact surface does not exist between the two elements. In one exemplary embodiment, for example, in the second portion $P_2$ of the contact surface $S_1$ between the first and second glasses 110 and 120, the glass materials of the first and second glasses 110 and 120 may be at least partially mixed together so that the boundary between the first and second glasses 110 and 120 may not exist. In an exemplary embodiment, at least part of the glass material of the first glass 110 may pass through the second glass 120 and may be mixed with the glass material of the second glass 120, and/or at least part of the glass material of the second glass 120 may pass through the first glass 110 and may be mixed with the glass material of the first glass 110.

A width $W_{P2}$ of the second portion $P_2$ of the contact surface $S_1$ between the first and second glasses 110 and 120, i.e., a bonding region between the first and second glasses 110 and 120, may be in a range of about 60 micrometers (μm) to about 120 μm or in a range of about 70 μm to about 100 μm. The term "bonding", as used herein, means placing two elements in contact with each other to be coupled together.

In an exemplary embodiment, a seed-like shaped structure $D_1$ may exist near the second portion $P_2$. The seed-like shaped structure $D_1$ may be formed in the process of bonding the first and second glasses 110 and 120. The seed-like shaped structure $D_1$ may have a long axis (e.g., a vertical axis in FIG. 3) and a short axis (e.g., a horizontal axis in FIG. 3). The seed-like shaped structure $D_1$ may be asymmetrical with respect to the short axis. The seed-like shaped structure $D_1$ may be arranged in such a manner that the short axis may be substantially parallel to the contact surface $S_1$, but the disclosure is not limited thereto. The length of the short axis of the seed-like shaped structure $D_1$ may be in a range of about 10 μm to about 20 μm.

In an exemplary embodiment, the first, second and third portions $P_1$, $P_2$ and $P_3$ may be substantially on a same level as each other (i.e., on a same plane parallel to a reference surface), and the first portion $P_1$ may be disposed between the second and third portions $P_2$ and $P_3$. In such an embodiment, the second portion $P_2$ where the physical boundary between the first and second glasses 110 and 120 substantially does not exist, i.e., the bonding region, may be spaced apart from the wavelength converter 150 with a predetermined distance. The maximum distance between the second portion $P_2$ and the wavelength converter 150 may be about 50 μm or larger. By spacing the second portion $P_2$, i.e., the bonding region, apart from the wavelength converter 150 with a distance longer than about 50 μm, the wavelength converter 150 may be effectively prevented from being damaged by high-temperature heat generated during the bonding of the first and second glasses 110 and 120.

Although not specifically illustrated, in an exemplary embodiment where the light source unit 100 is rectangular in a plan view, extending in the first direction X, the bonding region may be located on the sides of a pair of long sides and a pair of short sides of the light source unit 100, or on the sides of only the long sides or the short sides of the light source unit 100. That is, the bonding region may be substantially in a rectangular shape or in the shape of the equals sign "=".

The light sources 100b and the wavelength converter 150 of the light source unit 100 may be integrated into a single module by forming the concave groove 110r on the first glass 110, inserting the wavelength converter 150 in the concave groove 110r and then completely sealing the wavelength converter 150 with the second glass 120. As a result, the light sources 100b and the wavelength converter 150 may be effectively prevented from being misaligned, even in the presence of external impact, and light emitted from the light sources 100b may be effectively prevented from being released without passing through the wavelength converter 150. In such an embodiment, the light source unit 100 may achieve any intended color conversion rate and may thus minimize a defect in which wavelengths corresponding to particular colors have a higher ratio than other wavelengths, thereby failing to provide high-purity white light, i.e., color imbalance.

In an embodiment, since the first and second glasses 110 and 120, which provide space for accommodating the wavelength converter 150, are coupled to each other with almost no physical or visible boundary therebetween, at least partially, the wavelength converter 150 may be completely isolated from outside the light source unit 100. In such an embodiment, even when the temperature of the light source unit 100 increases due to light emitted by the light sources 100b, the bonding region between the first and second glasses 110 and 120 may not be deformed. Accordingly, the durability and reliability of the light source unit 100 may be improved.

Alternative exemplary embodiments of a light source unit will hereinafter be described with reference to FIGS. 4 to 10. The same or like elements shown in FIGS. 4 to 10 have been labeled with the same or like reference characters as used above to describe the exemplary embodiments of the light source unit 100 shown in FIG. 1, and any repetitive detailed description thereof will hereinafter be omitted or simplified.

Figure 4:
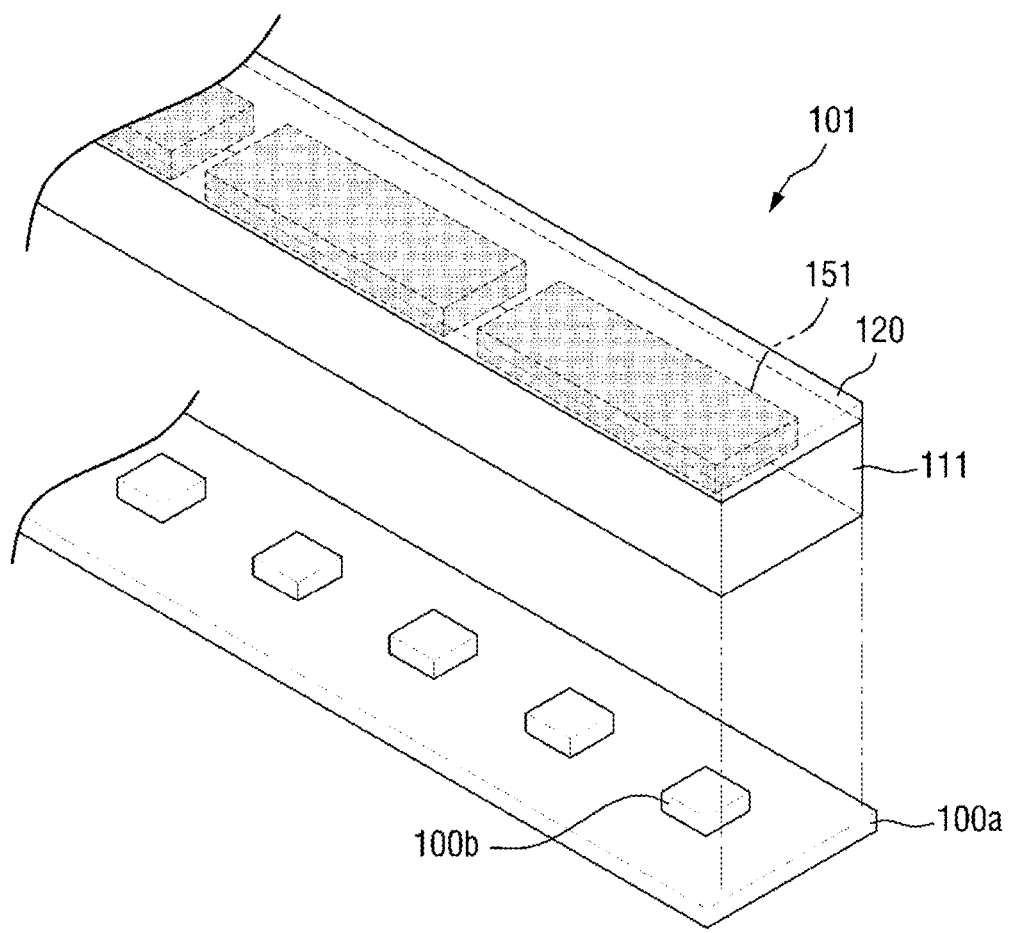
FIG. 4 is an exploded perspective view of a light source unit according to an alternative exemplary embodiment of the disclosure.

FIG. 4 is an exploded perspective view of a light source unit according to an alternative exemplary embodiment of the disclosure.

The light source unit 101 shown in FIG. 4 is substantially the same as the light source unit 100 of FIG. 1 except that a plurality of wavelength converters 151, which extend in a first direction X, are provided to be spaced apart from one another in the first direction X.

In an exemplary embodiment, a first glass 111 may provide space for accommodating the wavelength converters 151. In such an embodiment, empty spaces, in which the wavelength converters 151 are disposed, may be defined in the first glass 111. In one exemplary embodiment, for example, a first surface (e.g., the top surface in FIG. 4) of the first glass 111 may have a plurality of concave grooves having a larger width in the first direction X than in a second direction Y, and the light sources 100b may be inserted in the concave grooves. Barriers may be defined between the concave grooves, and the first glass 111 may have a largest thickness at the barriers.

The wavelength converters 151 may be inserted in the concave grooves of the first glass 111, and may be disposed on the light sources 100b to be spaced apart from the light sources 100b in a third direction Z. In such an embodiment, the wavelength converters 151 may be separated from one another by the barriers.

The wavelength converters 151 may at least partially overlap with the light sources 100b and may extend in the first direction X. In one exemplary embodiment, for example, the wavelength converters 151 may have a larger width in the first direction X than in the second direction Y. The wavelength converters 151 may completely cover the light sources 100b in a plan view. FIG. 4 illustrates an exemplary embodiment in which one wavelength converter 151 is provided for or corresponds to every two light sources 100b thereby defining a basic unit of repetition, and the basic unit of repetition repeatedly arranged in the first direction X, but the disclosure is not limited thereto. Alternatively, each of the wavelength converters 151 may be disposed to correspond to one light source 100b or more than three light sources 100b.

The wavelength converters 151 may convert the wavelength of light transmitted therethrough. Each of the wavelength converters 151 may include a base resin and wavelength conversion particles dispersed in the base resin. The wavelength converters 151 are substantially the same as the wavelength converter 150 of FIG. 1, and thus, any repetitive description of the same or like elements thereof will be omitted.

A second glass 120 may be disposed on the wavelength converters 151. The wavelength converters 151 may be completely surrounded and sealed by the first and second glasses 111 and 120. In an exemplary embodiment, first and second surfaces (e.g., the top and bottom surfaces in FIG. 4) of the second glass 120 may both be substantially flat. The second glass 120 may be at least partially in direct contact with the wavelength converters 151. In one exemplary embodiment, for example, the second glass 120 may be at least partially fused to the first glass 111.

Figure 5:
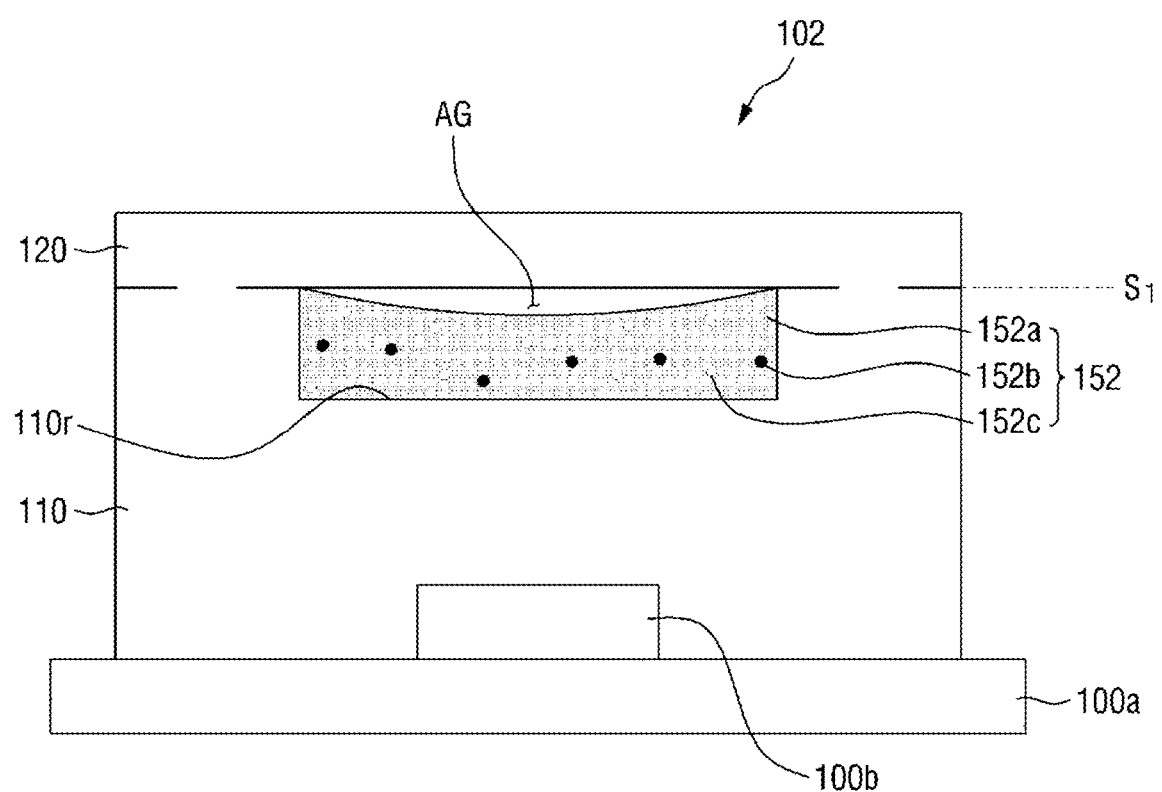
FIGS. 5 through 7 are cross-sectional views of light source units according to other alternative exemplary embodiments of the disclosure.

FIG. 5 is a cross-sectional view of a light source unit according to another alternative exemplary embodiment of the disclosure.

Referring to FIG. 5, an exemplary embodiment of a light source unit 102 may include a light source circuit board 100a, one or more light sources 100b, which are disposed, e.g., mounted, on the light source circuit board 100a and emit light, and a wavelength converter 152, which is disposed on the light sources 100b. The wavelength converter 152 may include a base resin 152a and wavelength conversion particles (152b and 152c) dispersed in the base resin 152a. The light source unit 102 of FIG. 5 is substantially the same as the light source unit 100 of FIG. 1 except that a gap AG is defined between a wavelength converter 152 and a second glass 120.

The wavelength converter 152 may be inserted in a concave groove 110r of a first glass 110. The wavelength converter 152 may be at least partially in direct contact with the first glass 110. In an exemplary embodiment, the wavelength converter 152 may not completely fill the concave groove 110r of the first glass 110. In such an embodiment, the volume of the wavelength converter 152 may be smaller than the volume of the space defined by the concave groove 110r of the first glass 110.

The second glass 120 may be disposed on the wavelength converter 152. The second glass 120 may be a cover member disposed on the first glass 110 and the wavelength converter 152 to seal the wavelength converter 152. First and second surfaces of the second glass 120 may both be substantially flat. The second glass 120 may be at least partially fused to the first glass 110.

In an exemplary embodiment, the second glass 120 may be spaced apart from the wavelength converter 152 with a predetermined distance. A first surface (e.g., the top surface in FIG. 5) of the wavelength converter 152 that is facing to the second glass 120 may be located below a contact surface $S_1$ between the first and second glasses 110 and 120. Accordingly, the gap AG may be formed between the second glass 120 and the wavelength converter 152. In an exemplary embodiment, the gap AG may be filled with a nitrogen gas ($N_2$) or an air layer. The gap AG may form a low-refractive-index region having a lower refractive index than the wavelength converter 152 and the second glass 120.

The light source unit 102 may allow high-purity white light obtained by the wavelength converter 152 to pass through the gap AG, which is a low-refractive-index region, before passing through the second glass 120 and thus to appear even whiter. In such an embodiment, the efficiency of color conversion may be further improved by forming the gap AG between the wavelength converter 152 and the second glass 120. In such an embodiment, the direction in which white light obtained by color conversion is emitted may be controlled by changing the shape of the top surface of the wavelength converter 152.

Figure 6:
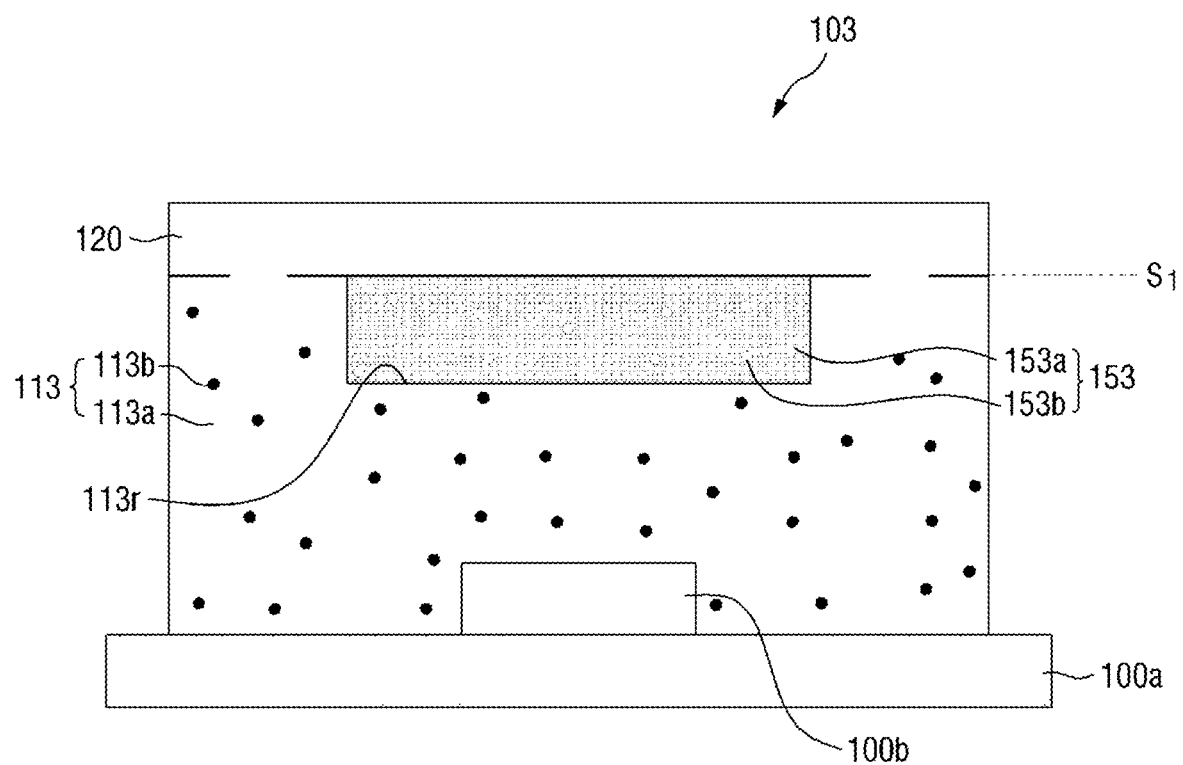

FIG. 6 is a cross-sectional view of a light source unit according to another alternative exemplary embodiment of the disclosure.

Referring to FIG. 6, an exemplary embodiment of a light source unit 103 may include a light source circuit board 100a, one or more light sources 100b, which are disposed, e.g., mounted, on the light source circuit board 100a and emit light, and a wavelength converter 153, which is disposed on the light sources 100b. The light source unit 103 of FIG. 6 is substantially the same as the light source unit 100 of FIG. 1 except that a first glass 113 includes wavelength conversion particles dispersed therein.

The first glass 113 may include second wavelength conversion particles 113b dispersed in a glass body 113a. The second wavelength conversion particles 113b may include a quantum dot material or a fluorescent material that emit green light. In an exemplary embodiment, the wavelength conversion particles included in the first glass 113 may consist essentially of only the second wavelength conversion particles 113b that emit green light.

A wavelength converter 153 may be inserted in a concave groove 113r of the first glass 113. The wavelength converter 153 may include a base resin 153a and first wavelength conversion particles 153b dispersed in the base resin 153a. The first wavelength conversion particles 153b may include a quantum dot material or a fluorescent material that emit red light. In an exemplary embodiment, the wavelength converter 153 may consist essentially of only the first wavelength conversion particles 153b that emit red light.

The average diameter of the first wavelength conversion particles 153b dispersed in the wavelength converter 153 may be larger than the average diameter of the second wavelength conversion particles 113b dispersed in the first glass 113. In one exemplary embodiment, for example, the average diameter of the first wavelength conversion particles 153b that emit red light is in a range of about 55 Å to about 65 Å, and the average diameter of the second wavelength conversion particles 113b that emit green light is in a range of about 40 Å to about 50 Å.

In an exemplary embodiment where the light sources 100b emit blue light having a single peak wavelength in a range of about 430 nm to 470 nm, the blue light emitted by the light sources 100b may pass through the first glass 113 and then through the wavelength converter 153. In such an embodiment, at least some blue light emitted by the light sources 100b may be converted into green light having a peak wavelength in a range of about 530 nm to 570 nm by the second wavelength conversion particles 113b. In such an embodiment, at least some blue light emitted by the light sources 100b may directly pass through the first glass 113. Accordingly, the light emitted by the light sources 100b and then transmitted through the first glass 113 may be converted into cyan light having only green and blue peak wavelengths.

At least some blue light transmitted through the first glass 113 may be converted into red light having a peak wavelength in a range of about 610 nm to 650 nm by the first wavelength conversion particles 153b, and at least some blue light transmitted through the first glass 113 may directly pass through the wavelength converter 153. At least some green light transmitted through the first glass 113 may be converted into red light having a peak wavelength in a range of about 610 nm to 650 nm by the first wavelength conversion particles 153b, and at least some green light transmitted through the first glass 113 may directly pass through the wavelength converter 153. In such an embodiment, as described above, the light emitted by the light sources 100b and then transmitted through the first glass 113 and the wavelength converter 153 may be converted into high-purity white light having only red, green and blue peak wavelengths.

Figure 7:
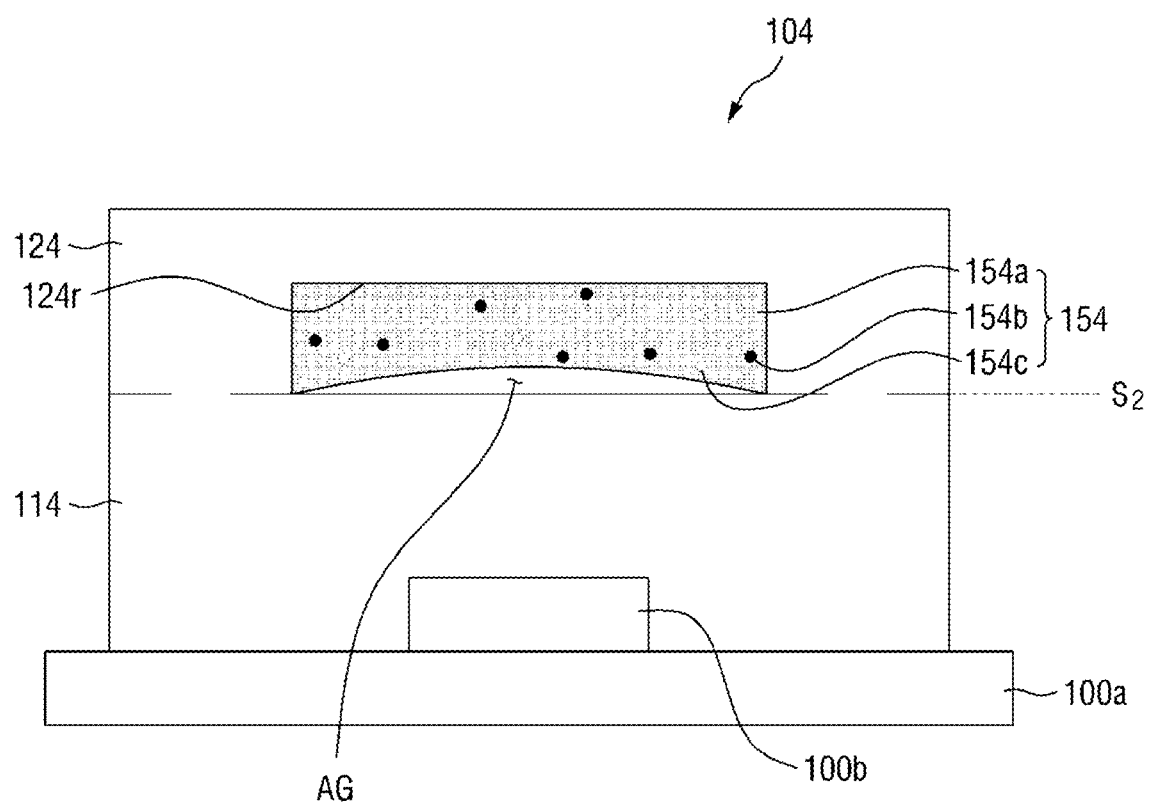

FIG. 7 is a cross-sectional view of a light source unit according to another alternative exemplary embodiment of the disclosure.

Referring to FIG. 7, an exemplary embodiment of a light source unit 104 may include a light source circuit board 100a, one or more light sources 100b, which are disposed, e.g., mounted, on the light source circuit board 100a and emit light, and a wavelength converter 154, which is disposed on the light sources 100b. The wavelength converter 154 may include a base resin 154a and wavelength conversion particles (154b and 154c) dispersed in the base resin 154a. The light source unit 104 of FIG. 7 is substantially the same as the light source unit 100 of FIG. 1 except that a wavelength converter 154 is inserted in a concave groove 124r of a second glass 124.

A first glass 114 may be disposed on light sources 100b. The first glass 114 may be a sealing member disposed on the light source circuit board 100a and the light sources 100b to seal and fix the light sources 100b. Recessed grooves may be defined on a second surface (e.g., the bottom surface in FIG. 7) of the first glass 114, and the light sources 100b may be inserted in the recessed grooves. In an exemplary embodiment, a first surface (e.g., the top surface in FIG. 7) of the first glass 114 may be substantially flat.

The wavelength converter 154 may be disposed on the light sources 100b to be spaced apart from the light sources 100b in a third direction Z. In an exemplary embodiment, the wavelength converter 154 may be spaced apart from the first glass 114 with a predetermined distance. A second surface (e.g., the bottom surface in FIG. 7) of the wavelength converter 154 that is facing to the first glass 114 may be located below a first surface (e.g., the top surface in FIG. 7) of the first glass 114. In such an embodiment, the second surface of the wavelength converter 154 may be located above a contact surface $S_2$ between the first and second glasses 114 and 124. Accordingly, a gap AG may be formed between the first glass 114 and the wavelength converter 154. The gap AG may be filled with a nitrogen gas ($N_2$) or an air layer. The gap AG may form a low-refractive-index region having a lower refractive index than the wavelength converter 154 and the second glass 124.

The second glass 124 may be disposed on the wavelength converter 154. The second glass 124 may be a cover member disposed on the first glass 114 and the wavelength converter 152 to seal the wavelength converter 154. In an exemplary embodiment, the second glass 124 may provide space for accommodating the wavelength converter 154. In one exemplary embodiment, for example, the second surface (e.g., the bottom surface in FIG. 7) of the second glass 124 may have a trench-shaped concave groove 124r extending in one direction.

The second glass 124 may be at least partially in direct contact with, and coupled to, the first glass 114. In one exemplary embodiment, for example, the first and second glasses 114 and 124 may be at least partially fused to each other. In such an embodiment, the contact surface $S_2$ between the first and second glasses 114 and 124 may include a portion where the physical interface between the first and second glasses 114 and 124 exists and a portion (i.e., a bonding region) where the physical interface between the first and second glasses 114 and 124 substantially does not exist. In an exemplary embodiment, a seed-like shaped structure (not illustrated) may exist near the bonding region. The shape and the size of the bonding region the first and second glasses 114 and 124 of the light source unit 104 may be substantially the same as the shape and the size of the bonding region between the first and second glasses 110 and 120 of the light source unit 100 of FIG. 1, and thus, any repetitive detailed descriptions thereof will be omitted.

Figure 8:
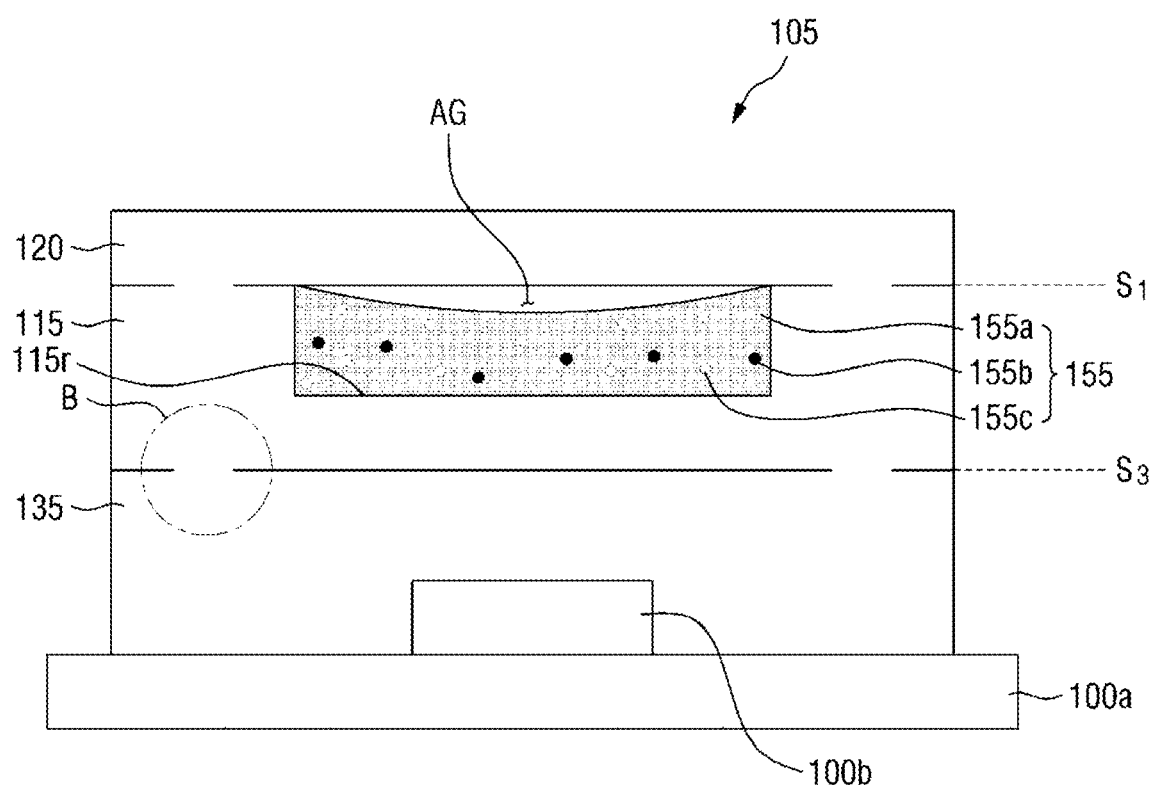
FIG. 8 is a cross-sectional view of a light source unit according to another alternative exemplary embodiment of the disclosure.
Figure 9:
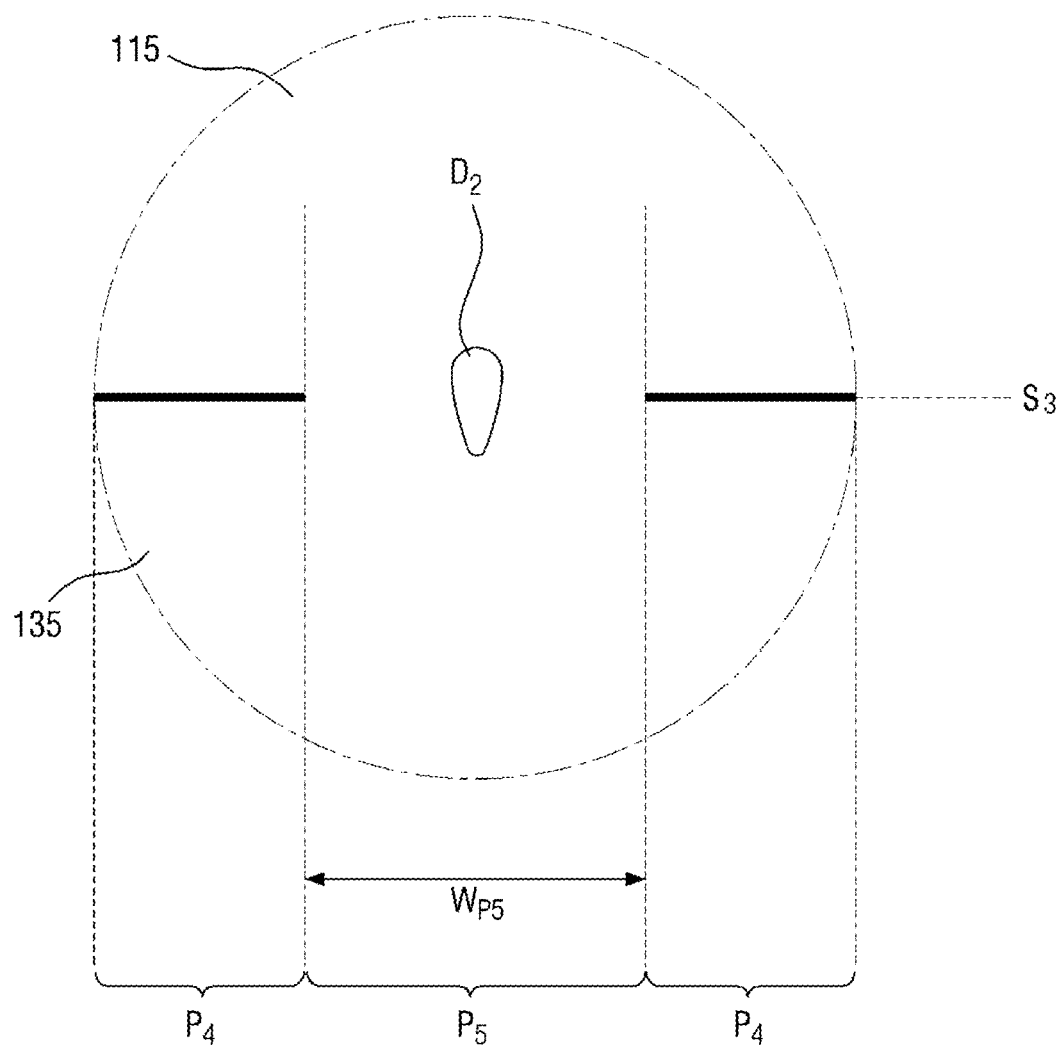
FIG. 9 is an enlarged view of an area B of FIG. 8.

FIG. 8 is a cross-sectional view of a light source unit according to another alternative exemplary embodiment of the disclosure. FIG. 9 is an enlarged view of an area B of FIG. 8.

Referring to FIGS. 8 and 9, an exemplary embodiment of a light source unit 104 may include a light source circuit board 100a, one or more light sources 100b, which are disposed, e.g., mounted, on the light source circuit board 100a and emit light, and a wavelength converter 155, which is disposed on the light sources 100b. The wavelength converter 155 may include a base resin 155a and wavelength conversion particles (155b and 155c) dispersed in the base resin 155a. The light source unit 105 of FIGS. 8 and 9 is substantially the same as the light source unit 102 of FIG. 5 except that the light source unit 105 further includes a third glass 135 disposed between a first glass 115 and a light source circuit board 100a.

The third glass 135 may be disposed on light sources 100b. The third glass 135 may include or be formed of a glass material having a high light transmittance. The third glass 135 may be formed of the same glass material as, or a different glass material from, a first glass 115 and a second glass 120. The third glass 135 may be a sealing member disposed on the light source circuit board 100a and the light sources 100b to seal and fix the light sources 100b. Concave grooves may be defined on a second surface (e.g., the bottom surface in FIGS. 8 and 9) of the third glass 135, and the light sources 100b may be inserted in the concave grooves. A first surface (e.g., the top surface in FIGS. 8 and 9) of the third glass 135 may be substantially flat. In an exemplary embodiment, a first surface (e.g., the top surface in FIG. 7) of the first glass 115 may be substantially flat.

The first glass 115 may be disposed on the third glass 135. The first glass 115 may be disposed between the third glass 135 and a wavelength converter 155 and may secure space between the light sources 100b and the wavelength converter 155. A second surface (e.g., the bottom surface in FIGS. 8 and 9) of the first glass 115 may be substantially flat. In an exemplary embodiment, the first glass 115 may provide space for accommodating the wavelength converter 155. In one exemplary embodiment, for example, the first surface (e.g., top surface in FIG. 8) of the first glass 115 may include a trench-shaped concave groove 115r extending in one direction. The wavelength converter 155 may be inserted in the concave groove 115r of the first glass 115.

The first glass 115 may be at least partially in direct contact with, and coupled to, the third glass 135. In one exemplary embodiment, for example, the first and third glasses 115 and 135 may be at least partially fused to each other. In such an embodiment, the first and third glasses 115 and 135 may be at least partially fused to each other and may thus define a single unitary body with each other.

A contact surface $S_3$ between the first and third glasses 115 and 135 may include a fourth portion $P_4$ where the physical interface between the first and third glasses 115 and 135 exists and a fifth portion $P_5$ where the physical interface between the first and third glasses 115 and 135 substantially does not exist. In the fifth portion $P_5$ of the contact surface $S_3$ between the first and third glasses 115 and 135, the glass materials of the first and third glasses 115 and 135 may be at least partially mixed together so that the boundary between the first and third glasses 115 and 135 may not exist.

A width $W_{P5}$ of the fifth portion $P_5$ of the contact surface $S_3$ between the first and third glasses 115 and 135, i.e., a bonding region between the first and third glasses 115 and 135, may be in a range of about 60 μm to about 120 μm or in a range of about 70 μm to about 100 μm. The fifth portion $P_5$ may be spaced apart from the wavelength converter 155 with a predetermined distance without overlapping with the wavelength converter 155.

In an exemplary embodiment, a seed-like shaped structure $D_2$ may exist near the fifth portion $P_5$. The seed-like shaped structure $D_2$ may be formed in the process of bonding the first and third glasses 115 and 135. The seed-like shaped structure $D_2$ may be substantially the same as its counterpart of FIG. 3, and thus, any repetitive detailed description thereof will be omitted.

Figure 10:
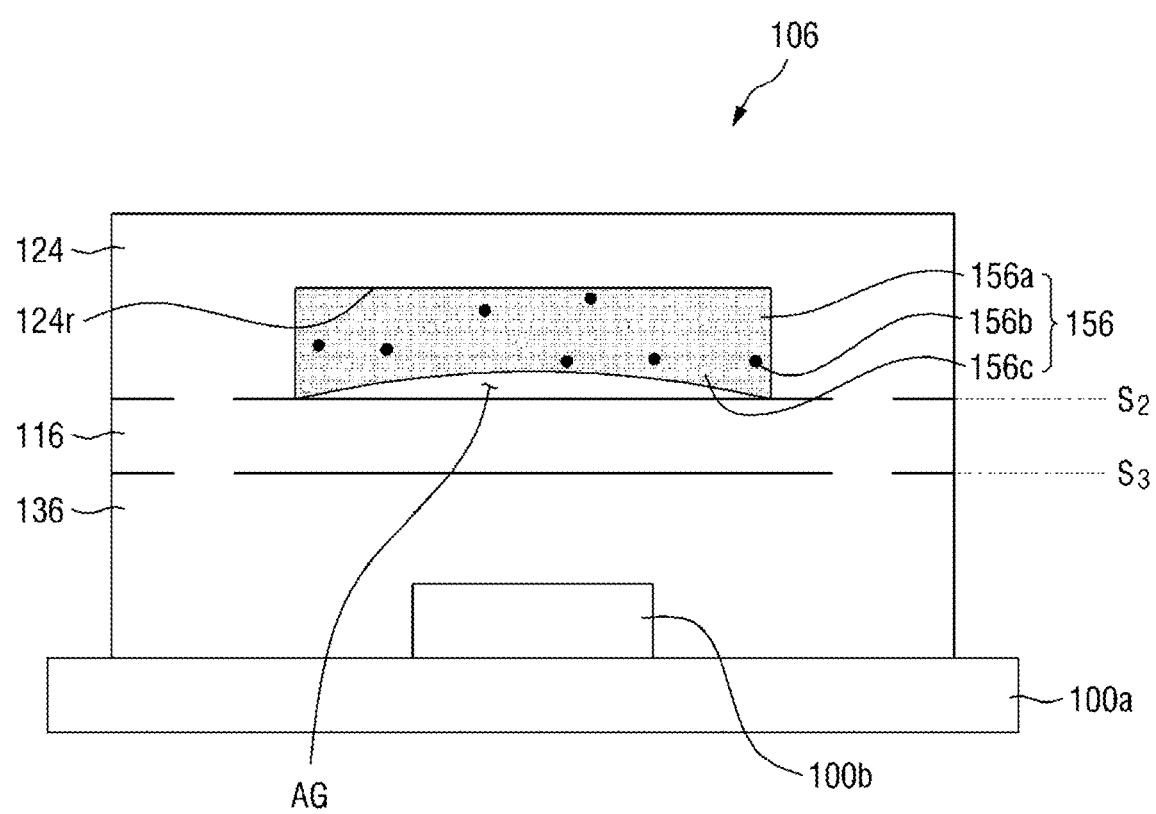
FIG. 10 is a cross-sectional view of a light source unit according to another alternative exemplary embodiment of the disclosure.

FIG. 10 is a cross-sectional view of a light source unit according to another alternative exemplary embodiment of the disclosure.

Referring to FIG. 10, an exemplary embodiment of a light source unit 104 may include a light source circuit board 100a, one or more light sources 100b, which are disposed, e.g., mounted, on the light source circuit board 100a and emit light, and a wavelength converter 156, which is disposed on the light sources 100b. The wavelength converter 156 may include a base resin 156a and wavelength conversion particles (156b and 156c) dispersed in the base resin 156a. The light source unit 106 is substantially the same as the light source unit 104 of FIG. 7 except that the light source unit 106 further includes a third glass 136 disposed between a first glass 116 and a light source circuit board 100a.

The third glass 136 may be disposed on light sources 100b. The third glass 136 may be a sealing member disposed on the light source circuit board 100a and the light sources 100b to seal and fix the light sources 100b. Concave grooves may be formed on a second surface (e.g., the bottom surface in FIG. 10) of the third glass 136, and the light sources 100b may be inserted in the concave grooves. A first surface (e.g., the top surface in FIG. 10) of the third glass 136 may be substantially flat.

The first glass 116 may be disposed on the third glass 136. First and second surfaces (e.g., the top and bottom surfaces in FIG. 10) of the first glass 116 may both be substantially flat.

The first glass 116 may be at least partially in direct contact with, and coupled to, the third glass 136. In one exemplary embodiment, for example, the first and third glasses 116 and 136 may be at least partially fused to each other. In such an embodiment, the first and third glasses 116 and 136 may be at least partially fused to each other and may thus define a single unitary body with each other. The shape and the size of a bonding region between the first glass 116 and a second glass 124 of the light source unit 106 may be substantially the same as the shape and the size of the bonding region between the first and second glasses 114 and 124 of the light source unit 104 of FIG. 7, and the shape and the size of a bonding region between the first and third glasses 116 and 136 of the light source unit 106 may be substantially the same as the shape and the size of the bonding region between the first and third glasses 115 and 135 of the light source unit 105 of FIG. 8. Thus, any repetitive detailed descriptions of the bonding regions in the light source unit 106 will be omitted.

Hereinafter, exemplary embodiments of a display device according to the disclosure will be described in detail with reference to FIGS. 11 to 13.

Figure 11:
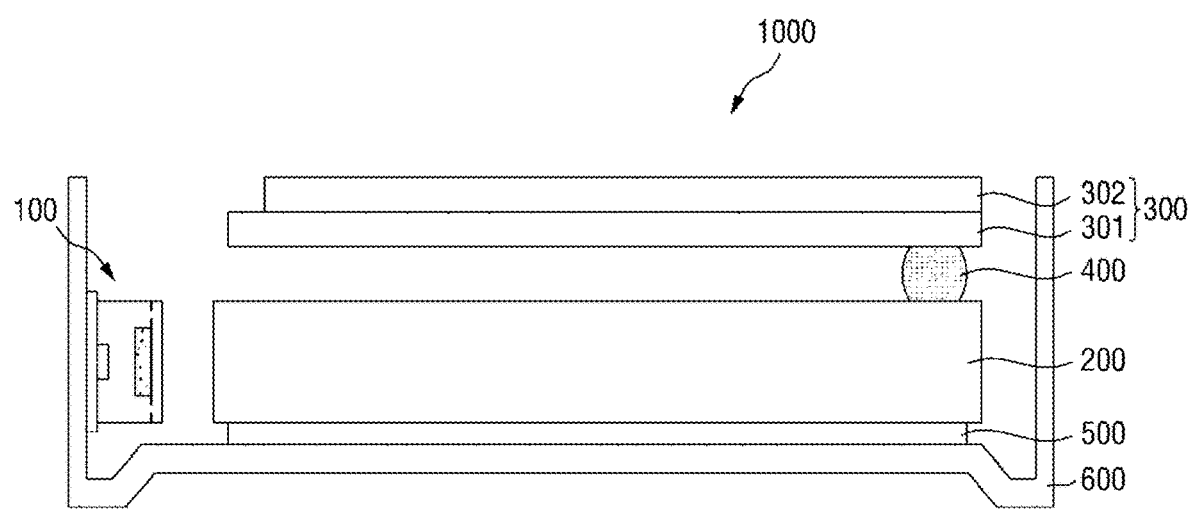
FIG. 11 is a cross-sectional view of a display device according to an exemplary embodiment of the disclosure.

FIG. 11 is a cross-sectional view of a display device according to an exemplary embodiment of the disclosure.

Referring to FIG. 11, an exemplary embodiment of a display device 1000 may include a light guide plate 200, a light source unit 100 disposed on a light-entering side of the light guide plate 200, and a display panel disposed on a light-exiting side of the light guide plate 200, and may further include a bonding pattern 400 for bonding the light guide plate 200 to the display panel 300, a reflection sheet 500 disposed on the bottom surface of the light guide plate 200, and a bottom cover 600 disposed on the bottom surface of the reflection sheet 500.

The light guide plate 200 may be disposed below the display panel 300 to substantially overlap with the display panel 300. The light guide plate 200 guides light provided by the light source unit 100 to travel toward the display panel 300. In one exemplary embodiment, for example, a side surface of the light guide plate 200 adjacent to the light source unit 100 may be the light-entering side, and the top surface of the light guide plate 200 facing to the display panel 300 may be the light-exiting side. Light incident upon a side surface (i.e., the light-entering side) of the light guide plate 200 travels across the light guide plate 200 through total reflection, and at least some of the light guided through total reflection may be emitted through the top surface of the light guide plate 200. The light guide plate 200 may include or be formed of a glass material or a plastic material such as polycarbonate, polystyrene, or polyethylene terephthalate, but the material of the light guide plate 200 is not particularly limited. In such an embodiment, any material having a high light transmittance may be used for the light guide plate 200 as long as the light guide plate 200 properly guides the light provided by the light source unit 100 without any undesired loss.

The light source unit 100 may be disposed on a side of the light guide plate 200. The light source unit 100 may be spaced apart from the light guide plate 200 with a predetermined distance. In an exemplary embodiment, the light source unit 100 may be the light source unit 100 of FIG. 1 and may emit white light. The light source unit 100 may be configured to transmit blue light emitted from light sources (100b of FIG. 1) through a wavelength converter (150 of FIG. 1) to convert the blue light into white light and then to be incident upon the light guide plate 200. The light source unit 100 is substantially the same as the light source unit 100 of FIG. 1, and thus, any repetitive detailed description thereof will be omitted.

The display panel 300 may be disposed on the light guide plate 200. The display panel 300 may be a device that displays an image. In an exemplary embodiment, the display panel 300 may be a liquid crystal display ("LCD") panel. In an alternative exemplary embodiment, the display panel 300 may be an organic light-emitting display panel, a plasma display panel ("PDP"), or an electrophoretic display panel.

In an exemplary embodiment, where the display panel 300 is the LCD panel, the display panel 300 may include a first base substrate 301 and a second base substrate 302 and may further include a liquid crystal layer (not illustrated) interposed between the first and second base substrates 301 and 302, a common electrode (not illustrated), and pixel electrodes (not illustrated). The planar area of the first base substrate 301 may be larger than the planar area of the second base substrate 302.

The first and second base substrates 301 and 302 may be transparent insulating substrates. In one exemplary embodiment, for example, the first base substrate 301 and/or the second base substrate 302 may include or be formed of a glass material or a transparent plastic material. In an exemplary embodiment where the first base substrate 301, the second base substrate 302 and the light guide plate 200 are formed of a glass material, the first base substrate 301, the second base substrate 302 and the light guide plate 200 may include the same glass material as each other or different glass materials from each other.

The display panel 300 may be supported by the light guide plate 200. In one exemplary embodiment, for example, the display panel 300 and the light guide plate 200 may be coupled to each other by interposing the bonding pattern 400 between the display panel 300 and the light guide plate 200. The bonding pattern 400 may be disposed in direct contact with the first base substrate 301 and the light guide plate 200 of the display panel 300. By coupling the light guide plate 200 and the display panel 300 directly to each other with the bonding pattern 400, members such as a middle mold for supporting the display panel 300 may be omitted, and the number of parts or elements of the display device 1000 may be reduced.

The bonding pattern 400 may include a thermosetting resin or a UV curing resin. In an exemplary embodiment where the first base substrate 301 and the light guide plate 200 are both formed of a glass material, the bonding pattern 400 may improve the coupling force between the first base substrate 301 and the light guide plate 200 by making the materials of the first base substrate 301 and the light guide plate 200 identical or at least similar, and as a result, the durability of the display device 1000 may be improved.

The bonding pattern 400 may be disposed along an edge of the light guide plate 200. In an exemplary embodiment, the bonding pattern 400 may be disposed in a non-display area on an edge side of the display device 1000 not to interfere with the incidence of light emitted from the light guide plate 200 upon the display panel 300. In an exemplary embodiment where the light guide plate 200 is rectangular in a plan view, the light guide plate 200 has four edges, and the bonding pattern 400 may be disposed on only three edges of the light guide plate 200 except for the edge near the light source unit 100, i.e., the edge corresponding to the light-entering side of the light guide plate 200. In such an embodiment, the bonding pattern 400 may be substantially in an angular "U" shape in a plan view.

When the bonding pattern 400 is attached directly on the top surface of the light guide plate 200, at least some light provided by the light source unit 100 and/or at least some light traveling across the light guide plate 200 through total reflection may be absorbed by the bonding pattern 400, thereby causing optical loss. Thus, in an exemplary embodiment, the bonding pattern 400 is not provided on the light-entering side of the light guide plate 200, thereby minimizing such optical loss.

The reflection sheet 500 may be disposed below the light guide plate 200. The reflection sheet 500 may reflect light leaking from the bottom of the light guide plate 200 toward the display panel 300. Accordingly, the utilization efficiency of light provided by the light source unit 100 and the brightness of the display device 1000 may be improved. The reflection sheet 500 may include polyethylene terephthalate, for example, but the material of the reflection sheet 500 is not particularly limited as long as the material of the reflection sheet 500 has a high light reflectance. One surface of the reflection sheet 500 may be coated with a metal oxide such as titanium oxide or a metal material such as silver.

The bottom cover 600 may provide space for accommodating the light source unit 100 and the light guide plate 200. The bottom cover 600 may be substantially in a box shape including a bottom portion and side wall portions extending upwardly from the edges of the bottom portion. The bottom cover 600 may stably support and fix the light source unit 100 and the like. In one exemplary embodiment, for example, a light source circuit board (100a of FIG. 1) of the light source unit 100 may be attached on one of the side wall portions of the bottom cover 600.

The bottom cover 600 may include or be formed of a material having rigidity and high thermal conductivity, for example, stainless steel, aluminum, or an alloy thereof. In an exemplary embodiment, the bottom cover 600 may include or be formed of a material having a high light reflectivity. The bottoms of the reflective sheet 500 and the bottom cover 600 may be spaced apart from each other with a predetermined distance.

The display device 1000 is configured such that the display panel 300 can be coupled to the light guide plate 200 and can be supported by the light guide plate 200. As a result, the number of parts or elements of the display device 1000 may be reduced. Accordingly, the size of a non-display area on the sides of the display device 1000, i.e., the size of a bezel area, can be reduced, and the manufacturing processability and the durability of the display device 1000 can be improved.

In an exemplary embodiment, since the light sources 100b and the wavelength converter 150 define a single unitary body in the light source unit 100, the light sources 100b and the wavelength converter 150 may be effectively prevented from being misaligned, and as a result, white light with high color purity may be provided. In such an embodiment, since a first glass (110 of FIG. 1), which seals the light sources 100b of the light source unit 100, and a second glass (120 of FIG. 1), which accommodates the wavelength converter 150 together with the first glass 110, are directly coupled to each other, no deformation occurs in the bonding region between the first and second glasses 110 and 120 even when the temperature of the light source unit 100 increases due to heat emitted by the light sources 100b.

FIG. 11 illustrates an exemplary embodiment in which the light source unit 100 of FIG. 1 is employed in the display device 1000, but any one of the light source units of FIGS. 4 through 10 may also be applicable to the display device 1000.

Figure 12:
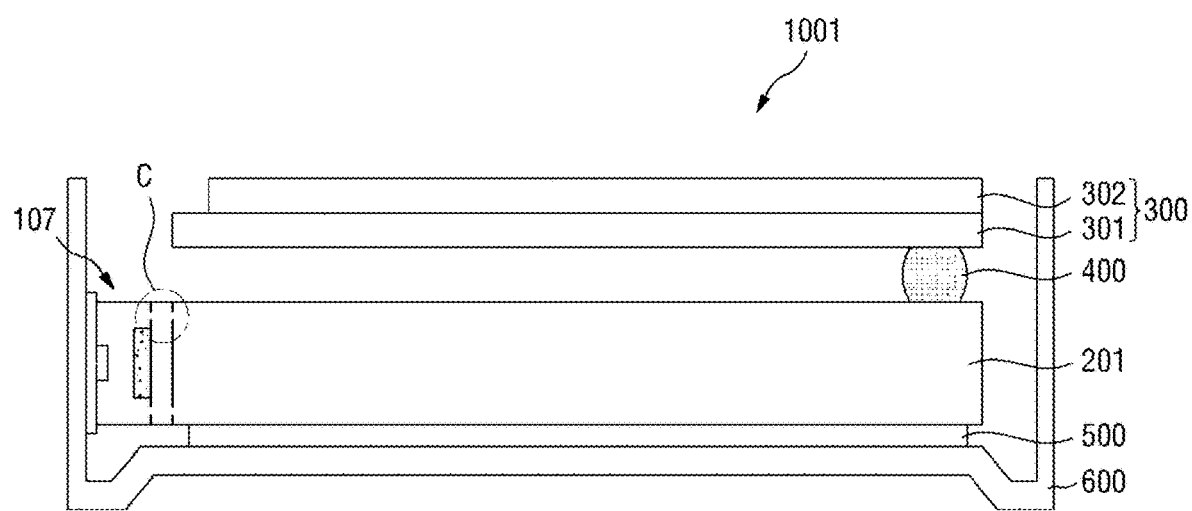
FIG. 12 is a cross-sectional view of a display device according to an alternative exemplary embodiment of the disclosure.

FIG. 12 is a cross-sectional view of a display device according to an alternative exemplary embodiment of the disclosure. FIG. 13 is an enlarged view of an area C of FIG. 12.

Figure 13:
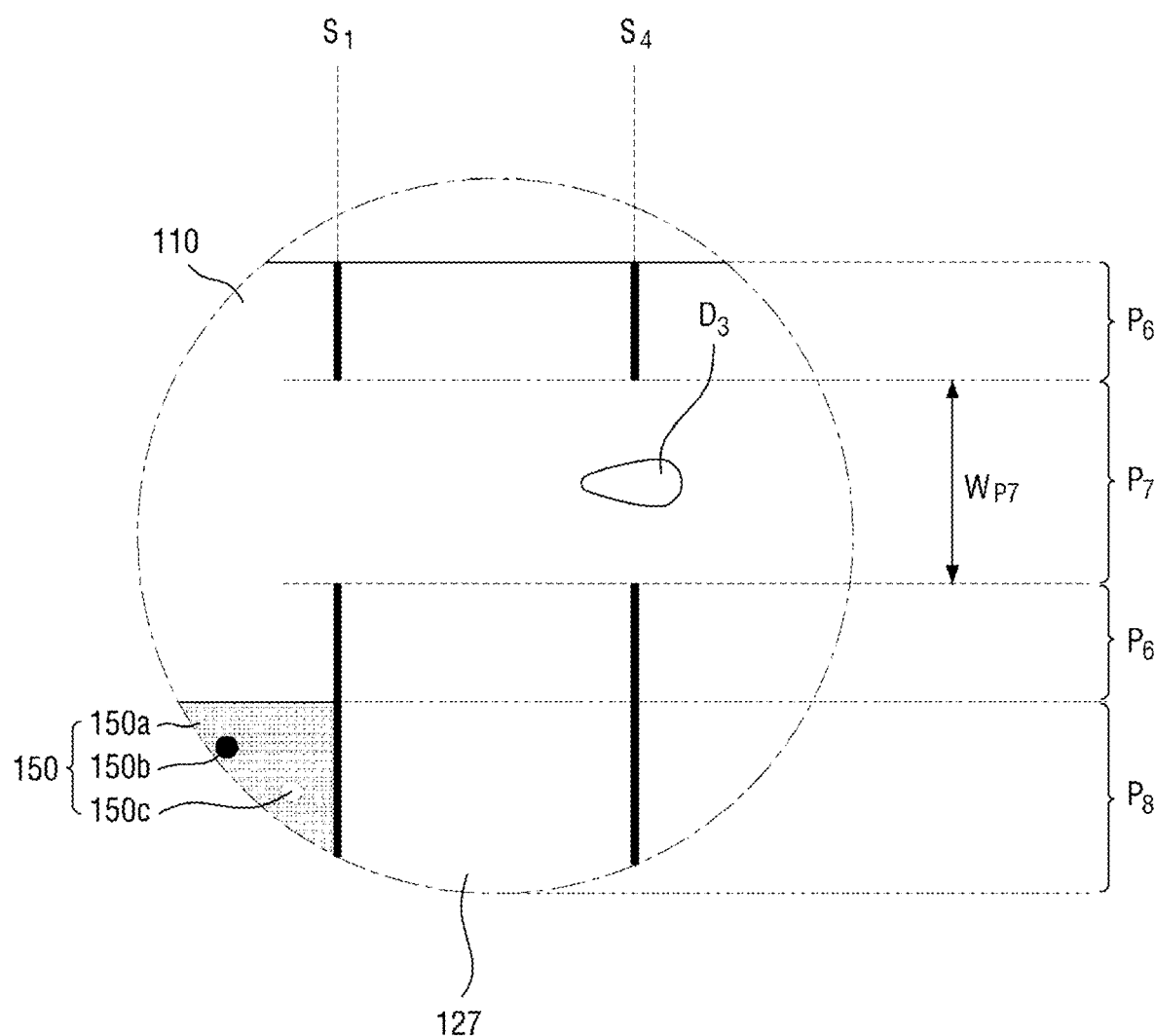
FIG. 13 is an enlarged view of an area C of FIG. 12.

The display device 1001 of FIGS. 12 and 13 is substantially the same the display device 1000 of FIG. 11 except that a light source unit 107 is not spaced apart from a light guide plate 201 and is at least partially in direct contact with the light guide plate 201.

In such an embodiment, the light source unit 107 includes a light source circuit board, light sources disposed on the light source circuit board, a wavelength converter 150 disposed on the light sources, and a first glass 110 and a second glass 127 that seals the wavelength converter 150. The top surface of the second glass 127 may be substantially flat.

In an exemplary embodiment, the second glass 127 may be at least partially in direct contact with the light guide plate 201. In such an embodiment, the second glass 127 may be at least partially in direct contact with the light guide plate 201 to be coupled to the light guide plate 201. In one exemplary embodiment, for example, the second glass 127 and the light guide plate 201 may be at least partially fused to each other. In such an embodiment, the second glass 127 and the light guide plate 201 may be at least partially fused and may thus define a single unitary body with each other.

In such an embodiment, as shown in FIG. 13, a contact surface $S_4$ between the second glass 127 and the light guide plate 201 may include a sixth portion $P_6$ where the physical interface between the second glass 127 and the light guide plate 201 exists, a seventh portion $P_7$ where the physical interface between the second glass 127 and the light guide plate 201 substantially does not exist, and an eighth portion $P_8$ overlapping with the wavelength converter 150. In one exemplary embodiment, for example, the light guide plate 201 may be formed of a glass material, and the glass materials of the second glass 127 and the light guide plate 201 may be at least partially mixed together in the seventh portion $P_7$ of the contact surface $S_4$ between the second glass 127 and the light guide plate 201 so that the boundary between the second glass 127 and the light guide plate 201 may not exist.

A width $W_{P7}$ of the seventh portion $P_7$ of the contact surface $S_4$ between the second glass 127 and the light guide plate 201, i.e., a bonding region between the second glass 127 and the light guide plate 201, may be in a range of about 60 μm to about 120 μm or in a range of about 70 μm to about 100 μm.

In an exemplary embodiment, a seed-like shaped structure $D_3$ may exist near the seventh portion $P_7$. The seed-like shaped structure $D_3$ may be formed in the process of bonding the second glass 127 and the light guide plate 201. The seed-like shaped structure $D_3$ may have a long axis (e.g., a horizontal axis in FIG. 13) and a short axis (e.g., a vertical axis in FIG. 13). The seed-like shaped structure $D_3$ may be asymmetrical with respect to the short axis. The seed-like shaped structure $D_3$ may be arranged in such a manner that the short axis may be substantially parallel to the contact surface $S_4$, but the disclosure is not limited thereto. The length of the short axis of the seed-like shaped structure $D_3$ may be in a range of about 10 μm to about 20 μm.

In an exemplary embodiment, the sixth, seventh and eighth portions $P_6$, $P_7$ and $P_8$ may be located on different levels from one another (not on a same plane parallel to a reference surface), and the sixth portion $P_6$ may be disposed between the seventh and eighth portions $P_7$ and $P_8$. In such an embodiment, the seventh portion $P_7$, in which the physical boundary between the second glass 127 and the light guide plate 201 substantially does not exist, i.e., a bonding region, may be spaced apart from the wavelength converter 150 with a predetermined distance without overlapping with the wavelength converter 150 in a horizontal direction. Although not specifically illustrated, the bonding region may be substantially in a rectangular shape or in the shape of the equals sign "=".

In such an embodiment, the display device 1001 may increase the coupling efficiency between the light source unit 107 and the light guide plate 201 by directly coupling the light source unit 107 and the light guide plate 201. In such an embodiment, a light-entering side of the light source unit 107 and a light-exiting side of the light guide plate 201 may be prevented from being misaligned, even if external impact is applied to the display device 1001, and as a result, optical loss between the light source unit 107 and the light guide plate 201 may be suppressed.

FIG. 12 illustrates an exemplary embodiment in which the light source unit 100 of FIG. 1 is employed in the display device 1001 as the light source unit 107 coupled to the light guide plate 201, but any one of the light source units of FIGS. 4 through 10 may also be applicable to the display device 1001 to be coupled to the light guide plate 201.

Hereinafter, an exemplary embodiment of a manufacturing method of a display device according to the disclosure will hereinafter be described with reference to FIGS. 14 to 18.

FIGS. 14 through 18 are cross-sectional views illustrating a manufacturing method of a display device according to an exemplary embodiment of the disclosure.

Figure 14:
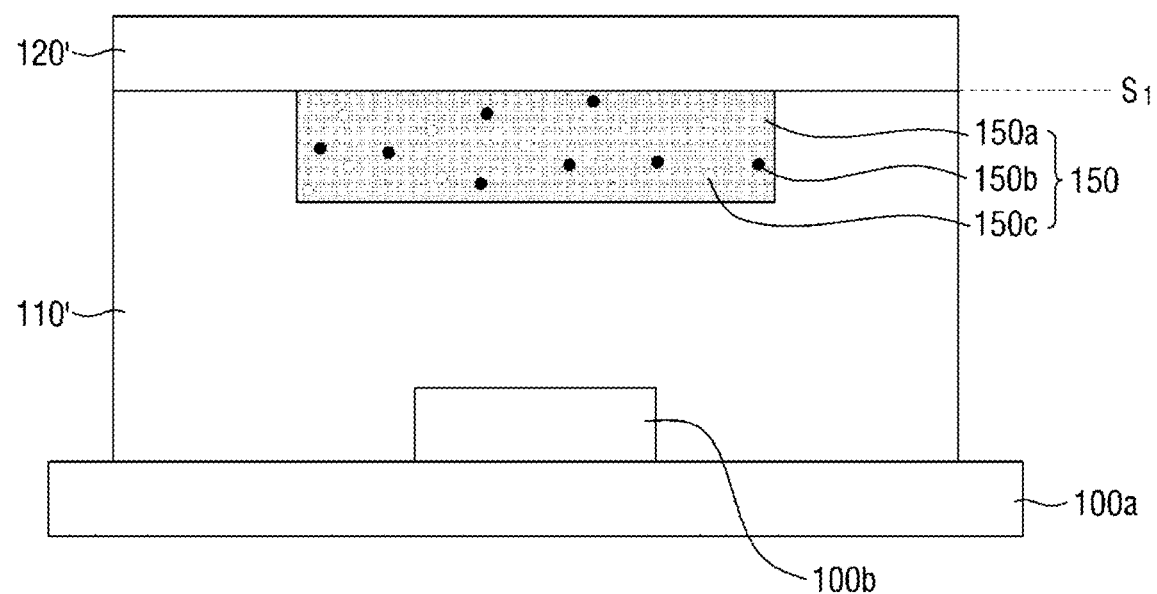
FIGS. 14 through 18 are cross-sectional views illustrating a manufacturing method of a display device according to an exemplary embodiment of the disclosure.

Referring to FIG. 14, a light source circuit board 100a, light sources 100b, which are mounted on the light source circuit board 100a and emit light, a first glass 110', which is disposed on the light source circuit board 100a and the light sources 100b to seal and fix the light sources 100b, a wavelength converter 150, which is disposed on the first glass 110', and a second glass 120', which is disposed on the first glass 110' and the wavelength converter 150, are prepared. The light source circuit board 100a, the light sources 100b, the first glass 110', and the wavelength converter 150 are substantially the same as their respective counterparts of FIG. 1, and thus, any repetitive detailed descriptions thereof will be omitted.

First and second surfaces (e.g., the top and bottom surfaces in FIG. 14) of the second glass 120' may be substantially flat. The second glass 120' is at least partially in contact with the first glass 110', but is yet to be coupled to the first glass 110'.

Figure 15:
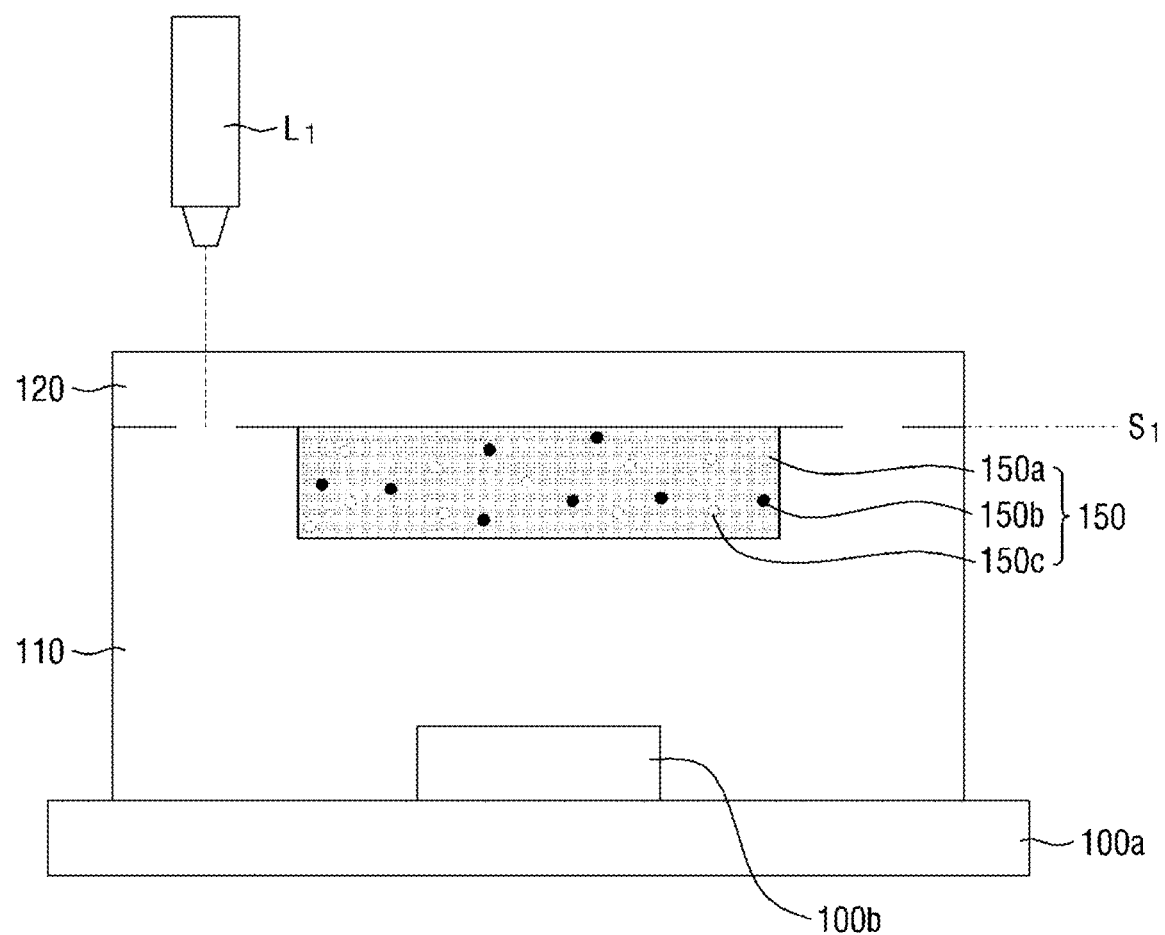

Thereafter, referring to FIG. 15, a first glass 110 and a second glass 120 are at least partially in direct contact with, and coupled to, each other by applying a laser $L_1$ to a contact surface $S_1$ between the first and second glasses 110 and 120. In one exemplary embodiment, for example, the first and second glasses 110 and 120 are at least partially fused to each other by applying the laser $L_1$. In such an embodiment, the first and second glasses 110 and 120 are at least partially fused to each other by applying the laser $L_1$, and are thus form a single unitary body with each other.

The contact surface $S_1$ between the first and second glasses 110 and 120 may include a portion where the physical interface between the first and second glasses 110 and 120 exists and a portion where the physical interface between the first and second glasses 110 and 120 substantially does not exist, i.e., a bonding region. In one exemplary embodiment, for example, as a result of the application of the laser $L_1$, the glass materials of the first and second glasses 110 and 120 may be at least partially mixed together at the contact surface $S_1$ between the first and second glasses 110 and 120 so that the boundary between the first and second glasses 110 and 120 may not exist.

In an exemplary embodiment, a seed-like shaped structure (not illustrated) may be formed in the bonding region at the contact surface $S_1$ between the first and second glasses 110 and 120. The seed-like shaped structure may be formed due to the first glass 110 and/or the second glass 120 being at least partially fused by the laser $L_1$. The shape and the size of a bonding region between the first and second glasses 110 and 120 are substantially the same as the shape and the size of the bonding region between the first and second glasses 110 and 120 of the light source unit 100 of FIG. 1, and thus, any repetitive detailed descriptions thereof will be omitted.

In an exemplary embodiment, the pulse width of the laser $L_1$, which is for bonding the first and second glasses 110 and 120, may be in a range of about 10 femto seconds to about 50 femto seconds. In such an embodiment, the laser $L_1$ may be applied to penetrate the second glass 120 and reach the contact surface $S_1$ between the first and second glasses 110 and 120. By controlling the pulse width of the laser $L_1$ to be within the range of about 10 femto seconds to about 50 femto seconds, any deformation in shape, structure, and physical properties may be effectively prevented from occurring in parts of the second glass 120 other than the bonding region between the first and second glasses 110 and 120, even when the laser $L_1$ is applied to pass through the second glass 120, and the reliability and durability of a light source unit may be improved.

Figure 16:

Thereafter, referring to FIGS. 15 and 16, a light source unit 107 is disposed on a side of a light guide plate 201, and the second glass 120 and the light guide plate 201 are placed at least partially in direct contact with, and coupled to, each other by applying a laser $L_2$ to the contact surface between the light guide plate 201 and the second glass 120 of the light source unit 107. In one exemplary embodiment, for example, the second glass 120 and the light guide plate 201 are at least partially fused to each other by applying the laser $L_2$. In such an embodiment, by applying the laser $L_2$, the second glass 120 and the light guide plate 201 are at least partially fused to each other and are thus define a single unitary body with each other.

The contact surface between the second glass 120 and the light guide plate 201 may include a portion where the physical interface between the second glass 120 and the light guide plate 201 exists and a portion where the physical interface between the second glass 120 and the light guide plate 201 substantially does not exist, i.e., a bonding region. In one exemplary embodiment, for example, as a result of the application of the laser $L_2$, the glass materials of the second glass 120 and the light guide plate 201 may be at least partially mixed together at the contact surface between the second glass 120 and the light guide plate 201 so that the boundary between the second glass 120 and the light guide plate 201 may not exist.

In an exemplary embodiment, a seed-like shaped structure (not illustrated) may be formed in the bonding region at the contact surface between the second glass 120 and the light guide plate 201. The seed-like shaped structure may be formed due to the second glass 120 and/or the light guide plate 201 being at least partially fused by the laser $L_2$. The shape and the size of the bonding region between the second glass 120 and the light guide plate 201 are substantially the same as the shape and the size of the bonding region between the second glass 127 and the light guide plate 201 of FIG. 12, and thus, any repetitive detailed descriptions thereof will be omitted.

In an exemplary embodiment, the pulse width of the laser $L_2$, which is for bonding the second glass 120 and the light guide plate 201, may be in a range of about 10 femto seconds to about 50 femto seconds. In such an embodiment, the laser $L_1$ may be applied in a diagonal direction to penetrate the second glass 120 and thus to reach the contact surface $S_1$ between the first and second glasses 110 and 120.

Figure 17:
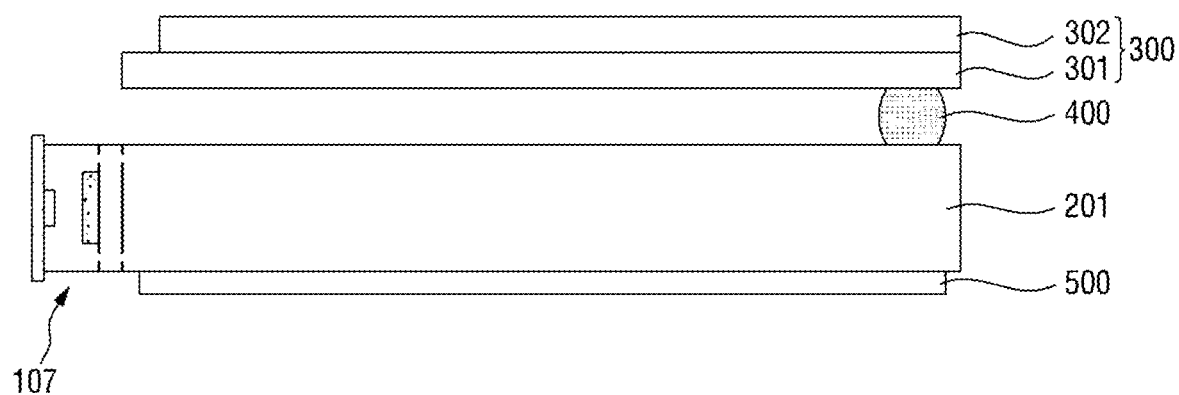

Thereafter, referring to FIG. 17, a display panel 300 is coupled to the top of the light guide plate 201, and a reflection sheet 500 is disposed below the light guide plate 201. The display panel 300 may be supported by the light guide plate 201, and the display panel 300 and the light guide plate 201 may be coupled to each other by interposing a bonding pattern 400 between the display panel 300 and the light guide plate 201. In such an embodiment, the light source unit 107, the light guide plate 201 and the display panel 300 may be integrated into a single module. The bonding pattern 400 may be placed in direct contact with a first base substrate 301 of the display panel 300 and the light guide plate 201. The bonding pattern 400 may be cured by heat or UV light.

The display panel, the bonding pattern 400, and the reflection sheet 500 are substantially the same as their respective counterparts of FIG. 12, and thus, any repetitive detailed descriptions thereof will be omitted.

Figure 18:
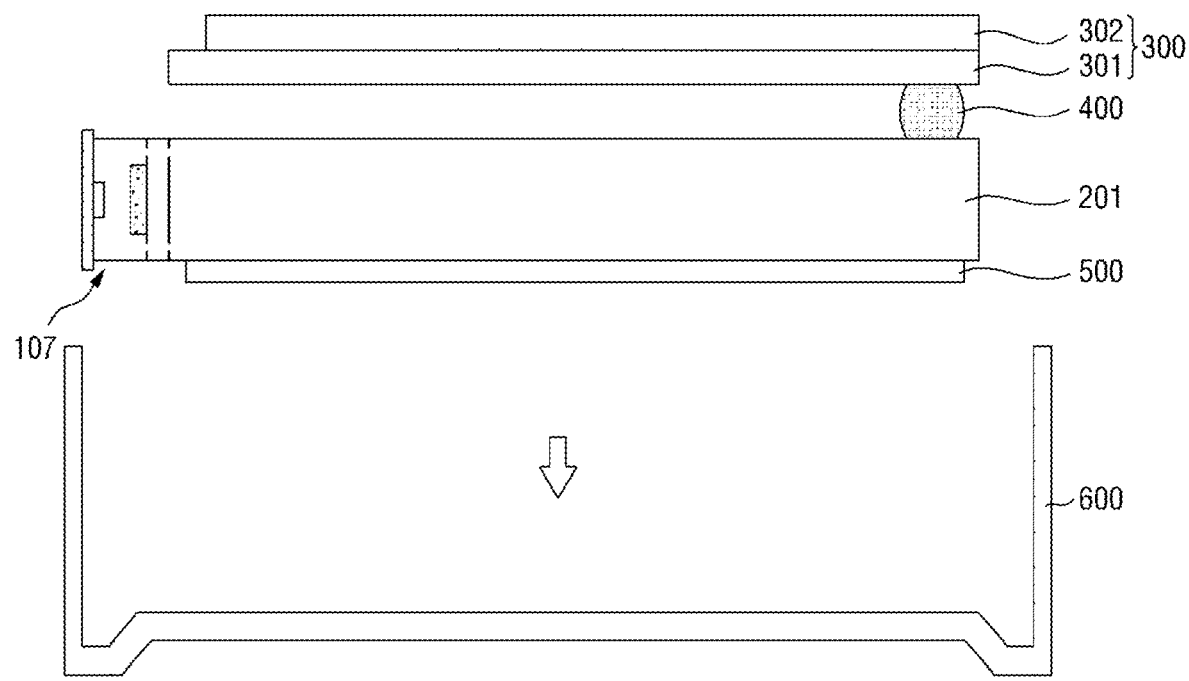

Thereafter, referring to FIG. 18, a bottom cover 600, in which storage space is defined, prepared, and a module, into which the light source unit 107, the light guide plate 201 and the display panel 300 are integrated, is coupled to the bottom cover 600 by inserting the light source unit 107 and the light guide plate 201 in the storage space of the bottom cover 600.

An exemplary embodiment of the manufacturing method of a display device may allow the number of parts or elements of a display device to be reduced, the manufacture of a display device to be simplified, and productivity to be improved. In such an embodiment, since the display panel 300, the light guide plate 201 and the light source unit 107 are integrated into a single module in advance and the single module is inserted later in the bottom cover 600, the display panel 300 and the light guide plate 201 may be precisely aligned with each other, and as a result, a light leakage defect that may be caused by misalignment between the display panel 300 and the light guide plate 201 may be effectively prevented.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A light source unit, comprising:
a light source circuit board;
light sources disposed on the light source circuit board and which emit light;
a wavelength converter disposed on the light sources to be spaced apart from the light sources and to partially overlap with the light sources;
a first glass disposed between the light sources and the wavelength converter; and
a second glass disposed on the wavelength converter and at least partially in direct contact with, and coupled to, the first glass,
wherein the first glass and the second glass are at least partially fused to each other where a physical interface between the first glass and the second glass directly contacting each other does not exist, and
wherein any other material except for the first glass and the second glass is absent at a portion where the second glass is coupled to the first glass.

2. The light source unit of claim 1, wherein the contact surface between the first glass and the second glass includes:
a first portion where the physical interface between the first glass and the second glasses exists;
a second portion where the physical interface between the first glass and the second glass does not exist; and
a third portion overlapping with the wavelength converter.

3. The light source unit of claim 2, wherein
the wavelength converter is in contact with the first glass or the second glass,
the wavelength converter is completely surrounded by the first glass and the second glass,
the first portion, the second portion and the third portion of the contact surface between the first glass and the second glass are on a same level as each other, and
the first portion is disposed between the second portion and the third portions.

4. The light source unit of claim 2, wherein
a first surface of the first glass facing to the second glass has a concave groove, and
the wavelength converter is received in the concave groove.

5. The light source unit of claim 4, further comprising:
a third glass disposed between the light sources and the first glass and at least partially in direct contact with, and coupled to, the first glass,
wherein
the third glass is in direct contact with the light source circuit board, and
the light sources are sealed by the third glass and the light source circuit board.

6. The light source unit of claim 4, wherein
a gap is defined between the wavelength converter and the second glass.

7. The light source unit of claim 2, wherein
a first surface of the second glass facing to the first glass has a concave groove, and
the wavelength converter is received in the concave groove.

8. The light source unit of claim 7, further comprising:
a third glass disposed between the light sources and the first glass and at least partially in direct contact with, and coupled to, the first glass,
wherein
the third glass is in direct contact with the light source circuit board, and
the light sources are sealed by the third glass and the light source circuit board.

9. The light source unit of claim 7, wherein
a gap is defined between the first glass and the wavelength converter.

10. The light source unit of claim 2, wherein
a seed-like shaped structure exists in the second portion,
the seed-like shaped structure has a long axis and a short axis,
the short axis is arranged in substantially parallel to the contact surface between the first glass and the second glass, and
a width of the second portion is in a range of about 60 micrometers to 120 mircometers.

11. The light source unit of claim 1, wherein
the light sources are disposed to be spaced apart from one another in a first direction, and
a width of the wavelength converter in a second direction, which intersects the first direction, is 1.2 to 2 times greater than a width of the light sources in the second direction.

12. The light source unit of claim 1, wherein
the light sources emit light having a blue wavelength,
the wavelength converter comprises:
a resin material; and
a wavelength conversion material dispersed in the resin material, and
the wavelength conversion material of the wavelength converter consists essentially of a red wavelength conversion material and a green wavelength conversion material.

13. The light source unit of claim 1, further comprising:
a green wavelength conversion material dispersed in the first glass,
wherein
the light sources emit light having a blue wavelength,
the wavelength converter includes a resin material and a wavelength conversion material dispersed in the resin material, and
the wavelength conversion material of the wavelength converter consists essentially of a red wavelength conversion material.

14. A display device, comprising:
a light guide plate having a light-entering side and a light-exiting side;
a light source unit disposed on the light-entering side of the light guide plate; and
a display panel disposed on the light-exiting side of the light guide plate, wherein the light source unit comprises:
  light sources which emit light;
  a wavelength converter disposed between the light sources and the light guide plate to be spaced apart from the light sources;
  a first glass disposed between the light sources and the wavelength converter; and
  a second glass disposed between the wavelength converter and the light guide plate and at least partially in direct contact with, and coupled to, the first glass,
  wherein the first glass and the second glass are at least partially fused to each other where a physical interface between the first glass and the second glass directly contacting each other does not exist, and
  wherein any other material except for the first glass and the second glass is absent at a portion where the second glass is coupled to the first glass.

15. The display device of claim 14, wherein the display panel is supported by the light guide plate.

16. The display device of claim 15, wherein
  a bonding pattern is defined between the light guide plate and the display panel,
  the light guide plate and the display panel are coupled to each other by the bonding pattern, and
  in a plan view, the bonding pattern extends along edges of the light guide plate, but not along an edge corresponding to the light-entering side of the light guide plate.

17. The display device of claim 14, wherein the light-entering side of the light guide plate and the second glass of the light source unit are in direct contact with, and coupled to, each other.

18. The display device of claim 17, wherein
  the contact surface between the second glass and the light guide plate comprises:
    a first portion where the physical interface between the second glass and the light guide plate exists;
    a second portion where the physical interface between the second glass and the light guide plate does not exist; and
    a third portion overlapping with the wavelength converter, and
  wherein the second portion is on a different level from the third portion.

* * * * *